US011910206B1

(12) United States Patent
Luo

(10) Patent No.: US 11,910,206 B1
(45) Date of Patent: Feb. 20, 2024

(54) INFORMATION PROCESSING METHOD, DEVICE AND PROCESSOR-READABLE STORAGE MEDIUM

(71) Applicant: DATANG MOBILE COMMUNICATIONS EQUIPMENT CO., LTD., Beijing (CN)

(72) Inventor: Zhangyu Luo, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 0 days.

(21) Appl. No.: 18/264,262

(22) PCT Filed: Jan. 26, 2022

(86) PCT No.: PCT/CN2022/074072
§ 371 (c)(1),
(2) Date: Aug. 4, 2023

(87) PCT Pub. No.: WO2022/166718
PCT Pub. Date: Aug. 11, 2022

(30) Foreign Application Priority Data

Feb. 4, 2021 (CN) .......................... 202110157648.X

(51) Int. Cl.
*H04W 24/02* (2009.01)
*H04W 4/20* (2018.01)

(52) U.S. Cl.
CPC .................................. *H04W 24/02* (2013.01)

(58) Field of Classification Search
CPC ..... H04W 24/00; H04W 24/02; H04W 24/08; H04W 24/10; H04W 4/20; H04W 8/08
See application file for complete search history.

(56) References Cited

U.S. PATENT DOCUMENTS 8,675,560 B2 * 3/2014 Yoo .......................... H04L 5/005
370/328
9,603,081 B2 * 3/2017 Seo ........................ H04W 72/23
(Continued)

FOREIGN PATENT DOCUMENTS

| CN | 101529807 A | 9/2009 |
| CN | 111565418 A | 8/2020 |

(Continued)

OTHER PUBLICATIONS

International Search Report and Written Opinion dated Apr. 18, 2022 in International Application No. PCT/CN2022/074072.
(Continued)

*Primary Examiner* — Quochien B Vuong
(74) *Attorney, Agent, or Firm* — Harness, Dickey & Pierce, P.L.C.

(57) ABSTRACT

An information processing method, a device and a processor-readable storage medium are provided. The method includes: based on an internal function unit's requirement description for first information's content, sending, by the PSS, a first message to a NE, where the first message includes a first information's identification and a first information's extraction method, to enable the NE to collect information according to the first information's identification and the first information's extraction method; receiving an information collection report sent by the NE, where the information collection report includes an NE collected information's identification, an NE collected information's extraction method, and an NE collected information's content; and based on the NE collected information's identification, the NE collected information's extraction method and the NE collected information's content, determining a correctness of the first information's identification and a correctness of the first information's extraction method, and distributing the information content with a correct identifi- (Continued)

cation and a correct extraction method to the corresponding internal functional unit. According to the method, multiple functional units of PSS may extract the first information's content simultaneously.

14 Claims, 8 Drawing Sheets

(56) References Cited

U.S. PATENT DOCUMENTS

| | | |
|---|---|---|
| 10,034,190 B2 * | 7/2018 | Lopes .................. H04W 24/02 |
| 2008/0243864 A1 | 10/2008 | McGauley et al. |
| 2020/0180910 A1 | 6/2020 | Kattainen et al. |

FOREIGN PATENT DOCUMENTS

| | | |
|---|---|---|
| CN | 112218272 A | 1/2021 |
| JP | 6203068 B2 | 9/2017 |
| WO | WO-2008/052389 A1 | 5/2008 |
| WO | WO-2020/245373 A1 | 12/2020 |

OTHER PUBLICATIONS

International Search Report and Written Opinion of the International Searching Authority for International Application No. PCT/EP2021/052749 dated Ocotber 11, 2021.

* cited by examiner

INFORMATION PROCESSING METHOD, DEVICE AND PROCESSOR-READABLE STORAGE MEDIUM

CROSS REFERENCE OF RELATED APPLICATIONS

The present disclosure is the U.S. national phase of PCT Application PCT/CN2022/074072 filed on Jan. 26, 2022, which claims a priority of Chinese patent disclosure No. 202110157648.X filed on Feb. 4, 2021, the disclosures of each of which are incorporated herein by reference in its entirety.

TECHNICAL FIELD

The present disclosure relates to wireless communication technologies, and in particular, the present disclosure relates to an information processing method, a device and a processor-readable storage medium.

BACKGROUND

In the evolution towards intelligent communication networks, there is a stage where traditional network elements and intelligent modules are functioning in parallel. At this stage, traditional network elements still perform traditional internal processing, and at the same time open the functions of traditional equipment to intelligent modules to detect the performance, stability, adaptability, etc. of the intelligent processing method and compare the same with the traditional method. As shown in FIG. 1, an intelligent control interface is established between the traditional network element and the intelligent module. The traditional network element opens the internal functions to the intelligent module through this interface. The intelligent module enables the intelligent upgrade and transformation of the traditional network element by controlling the functions that are opened.

Suppose an internal module of a device has specific inputs and outputs, when an external function needs to parallel or replace the internal module of the device, the device only needs to provide the inputs of the internal module to the external function, meanwhile let the external function to mimic the internal module's outputs. As shown in FIG. 2, module A provides information info A to the external function, meanwhile let the external function to return information info B, which realizes the parallel or supplanted processing of module A by the external function.

The external functions lay in the PSS (Parallel or Supplanting System) and play a parallel or supplanted role. The PSS implements the opening of the internal functions of the network element (NE) to the PSS by subscribing to the internal information of the NE.

As shown in FIG. 3, how two or more external functions simultaneously extract the content of the same information in the NE is an identified problem that needs to be solved.

SUMMARY

Aiming at the shortcomings of the existing methods, the present disclosure proposes an information processing method, a device, and processor-readable storage medium to solve the above-mentioned technical shortcomings.

In a first aspect, an information processing method is provided, performed by a Parallel or Supplanting System (PSS), including:

based on an internal function unit's requirement description for first information's content, sending, by the PSS, a first message to a network element (NE), where the first message includes a first information's identification and a first information's extraction method, to enable the NE to collect information according to the first information's identification and the first information's extraction method;

receiving an information collection report sent by the NE, where the information collection report includes an NE collected information's identification, an NE collected information's extraction method, and an NE collected information's content; and according to the NE collected information's identification, the NE collected information's extraction method and the NE collected information's content, determining a correctness of the first information's identification and a correctness of the first information's extraction method, and distributing the information content with a correct identification and a correct extraction method to the corresponding internal functional unit.

In an embodiment, the requirement description for the first information includes at least one of a demander's identification of the first information, the first information's identification, and the first information's extraction method;

in a case that the NE is acknowledged being able to collect information according to the first information's identification and the first information's extraction method, storing, by the PSS, the requirement description for the first information's content to form one new record in an information distribution description table;

in a case that the NE is acknowledged being able to collect information according to the first information's identification and the first information's extraction method, storing, by the PSS, the first information's identification and the first information's extraction method included in the first message to form one new record in an information extraction description table.

In an embodiment, the sending the first message to the network element (NE) includes:

when the first information's identification is the same as the second information's identification in an information extraction description table, and the first information's extraction method is the same as the second information's extraction method, not sending the first message to network element (NE);

or when the first information's identification is the same as the second information's identification in an information extraction description table, and the first information's extraction method is different from the second information's extraction methods, and the first information's extraction method belongs to one of the second information's extraction methods, not sending the first message to network element (NE);

or when the first information's identification is the same as the second information's identification in an information extraction description table, and the first information's extraction method is different from the second information's extraction methods, and one of the second information's extraction methods belongs to the first information's extraction method, sending the first message to the network element (NE), where the first message includes the first information's identification, the first information's extraction method and other second information's extraction methods that do not belong to the first information's extraction method; other second information's extraction methods that do not belong to the first information's extraction method are transmitted in the first message in an explicit manner through a full configuration method or in an implicit manner through an delta configuration method; or when the first information's identification is the same as a second information's identification in an information extraction description table, and the first information's extraction method is different from second information's extraction methods, and any of the second information's extraction methods does not belong to the first information's extraction method and the first information's extraction method does not belong to any of the second information's extraction methods, sending the first message to the network element (NE), where the first message includes the first information's identification, the first information's extraction method and the second information's extraction methods; the second information's extraction methods in the first message are transmitted in the first message in an explicit manner through a full configuration method or in an implicit manner through a delta configuration method.

In an embodiment, the forming one new record of the information extraction description table includes:

when the first information's identification is the same as the second information's identification in the information extraction description table, and the first information's extraction method is the same as one of the second information's extraction method, remaining the information extraction description table in status quo, without any update;

or when the first information's identification is the same as second information's identification in an information extraction description table, and the first information's extraction method is different from second information's extraction methods, and the first information's extraction method belongs to one of the second information's extraction methods, remaining the information extraction description table in status quo, without any update;

or when the first information's identification is the same as a second information's identification in an information extraction description table, and the first information's extraction method is different from second information's extraction methods, and one of the second information's extraction methods belongs to the first information's extraction method, updating the information extraction description table to obtain an updated information extraction description table, where the updated information extraction description table includes the first information's identification, the first information's extraction method and other second information's extraction methods that do not belong to the first information's extraction method;

or when the first information's identification is the same as a second information's identification in an information extraction description table, and the first information's extraction method is different from second information's extraction methods, and any of the second information's extraction methods does not belong to the first information's extraction method and the first information's extraction method does not belong to any one of the second information's extraction methods, updating the information extraction description table to obtain an updated information extraction description table, where the updated information extraction description table includes the first information's identification, the first information's extraction method, and the second information's extraction methods.

In an embodiment, based on the NE collected information's identification, the NE collected information's extraction method and the NE collected information's content, determining the correctness of the identification and the correctness of the first information's extraction method, and distributing the information content with a correct identification and a correct extraction method to the corresponding internal functional unit includes:

when the NE collected information's identification is the same as the first information's identification included in the information distribution description table, and the NE collected information's extraction method is the same as at least one of the first information's extraction method included in the information distribution description table, determining the NE collected information's content as the first information's content, and transmitting the first information's content to the corresponding internal functional unit, which is marked with the same extraction method in the information distribution description table; or when the NE collected information's identification is the same as the first information's identification included in the information distribution description table, and the NE collected information's extraction method is different from at least one of the first information's extraction method included in the information distribution description table, and the at least one of the first information's extraction method belongs to the NE collected information's extraction method, determining the NE collected information's content as the first information's content, and according to the requirement of all the first information's extraction method that belongs to the NE collected information's extraction method, transmitting the first information's content to the corresponding internal functional unit which is marked with the extraction method belonging to the NE collected information's extraction method in the information distribution description table.

In an embodiment, the method further includes:

when the NE collected information's identification is different from the identifications of all the information recorded in the information distribution description table, the information collected by the NE is incorrect, and an error type is unsubscribed information; or when the NE collected information's identification is the same as the first information's identification included in the information distribution description table, and the NE collected information's extraction method is different from any one of the first information's extraction methods included in the information distribution description table, and any one of the first information's extraction methods does not belong to the NE collected information's extraction method, the information collected by the NE is incorrect, and an error type is unsubscribed extraction method.

In a second aspect, an information processing method is provided, performed by a network element (NE), including:

receiving a first message sent by a Parallel or Supplanting System (PSS), where the first message includes a first information's identification and a first information's extraction method;

collecting information according to the first information's identification and the first information's extraction method, and determining an information collection report, wherein the information collection report comprises an NE collected information's identification, an NE collected information's extraction method, and an NE collected information's content'"; and sending the information collection report to the PSS, to enable the PSS to determine, based on the NE collected information's identification, the NE collected information's extraction method and the NE collected information's content, a correctness of the first information's identification and a correctness of the first information's extraction method, and distributing the information content with a correct identification and a correct extraction method to the corresponding internal functional unit'".

In a third aspect, an information processing device is provided, applied to a Parallel or Supplanting System (PSS), including a memory, a transceiver, and a processor:

the memory is configured to store a computer program; the transceiver is configured to send and receive data under a control of the processor; the processor is configured to read the computer program in the memory to perform:

based on an internal function unit's requirement description for the first information's content, sending, by the PSS, a first message to a network element (NE), where the first message includes a first information's identification and a first information's extraction method, to enable the NE to collect information according to the first information's identification and the first information's extraction method;

receiving an information collection report sent by the NE, where the information collection report includes an NE collected information's identification, an NE collected information's extraction method, and an NE collected information's content; and based on the NE collected information's identification, the NE collected information's extraction method and the NE collected information's content, determining a correctness of the first information's identification and a correctness of the first information's extraction method, and distributing the information content with a correct identification and a correct extraction method to the corresponding internal functional unit.

In an embodiment, the requirement description for the first information includes at least one of a demander's identification of the first information, the first information's identification, and the first information's extraction method;

in a case that the NE is acknowledged being able to collect information according to the first information's identification and the first information's extraction method, storing the requirement description for the first information's content, to form one new record in an information distribution description table;

in a case that the NE is acknowledged being able to collect information according to the first information's identification and the first information's extraction method, storing the first information's identification and the first information's extraction method included in the first message to form one new record in an information extraction description table.

In an embodiment, the sending the first message to the network element (NE) includes:

when the first information's identification is the same as a second information's identification in an information extraction description table, and the first information's extraction method is the same as a second information's extraction method, not sending the first message to network element (NE);

or when the first information's identification is the same as a second information's identification in an information extraction description table, and the first information's extraction method is different from second information's extraction methods, and the first information's extraction method belongs to one of the second information's extraction methods, not sending the first message to network element (NE);

or when the first information's identification is the same as a second information's identification in an information extraction description table, and the first information's extraction method is different from second information's extraction methods, and one of the second information's extraction methods belongs to the first information's extraction method, sending the first message to the network element (NE), where the first message includes the first information's identification, the first information's extraction method and other second information's extraction methods that do not belong to the first information's extraction method; other second information's extraction methods that do not belong to the first information's extraction method are transmitted in the first message in an explicit manner through a full configuration method or in an implicit manner through a delta configuration method;

or when the first information's identification is the same as a second information's identification in an information extraction description table, and the first information's extraction method is different from second information's extraction methods, and any of the second information's extraction methods does not belong to the first information's extraction method and the first information's extraction method does not belong to any of the second information's extraction methods, sending the first message to the network element (NE), where the first message includes the first information's identification, the first information's extraction method and the second information's extraction methods; the second information's extraction methods in the first message are transmitted in the first message in an explicit manner through a full configuration method or in an implicit manner through a delta configuration method.

In an embodiment, the forming the new record of the information extraction description table includes:

when the first information's identification is the same as the second information's identification in the information extraction description table, and the first information's extraction method is the same as one of second information's extraction methods, remaining the information extraction description table in status quo, without any update;

or when the first information's identification is the same as a second information's identification in an information extraction description table, and the first information's extraction method is different from second information's extraction methods, and the first information's extraction method belongs to one of the second information's extraction methods, remaining the information extraction description table in status quo, without any update;

or when the first information's identification is the same as a second information's identification in an information extraction description table, and the first information's extraction method is different from second information's extraction methods, and one of the second information's extraction methods belongs to the first information's extraction method, updating the information extraction description table to obtain an updated information extraction description table, where the updated information extraction description table includes the first information's identification, the first information's extraction method and other second information's extraction methods that do not belong to the first information's extraction method;

or when the first information's identification is the same as a second information's identification in an information extraction description table, and the first information's extraction method is different from second information's extraction methods, and any of the second information's extraction methods does not belong to the first information's extraction method and the first information's extraction method does not belong to any one of the second information's extraction methods, updating the information extraction description table to obtain an updated information extraction description table, where the updated information extraction description table includes the first information's identification, the first information's extraction method, and the second information's extraction methods.

In an embodiment, the based on the NE collected information's identification, the NE collected information's extraction method and the NE collected information's content, determining the correctness of the identification and the correctness of the first information's extraction method, and distributing the information content with a correct identification and a correct extraction method to the corresponding internal functional unit includes:

when the NE collected information's identification is the same as the first information's identification included in the information distribution description table, and the NE collected information's extraction method is the same as at least one of the first information's extraction method included in the information distribution description table, determining the NE collected information's content as the first information's content, and transmitting the first information's content to a corresponding functional unit which is marked with the same extraction method in the information distribution description table; or when the NE collected information's identification is the same as the first information's identification included in the information distribution description table, and the NE collected information's extraction method is different from at least one of the first information's extraction method included in the information distribution description table, and the at least one of the first information's extraction method belongs to the NE collected information's extraction method, determining the NE collected information's content as the first information's content, and according to the requirement of all the first information's extraction method that belongs to the NE collected information's extraction method, transmitting the first information's content to a corresponding functional unit with the extraction method belonging to the NE collected information's extraction method in the information distribution description table.

In an embodiment, when the NE collected information's identification is different from the identifications of all the information recorded in the information distribution description table, the information collected by the NE is incorrect, and an error type is unsubscribed information; or when the NE collected information's identification is the same as the first information's identification included in the information distribution description table, and the NE collected information's extraction method is different from any one of the first information's extraction methods included in the information distribution description table, and any one of the first information's extraction methods does not belong to the NE collected information's extraction method, the information collected by the NE is incorrect, and an error type is unsubscribed extraction method.

In a fourth aspect, an information processing device is provided, applied to a Network Element (NE), including a memory, a transceiver, and a processor:

the memory is configured to store a computer program; the transceiver is configured to send and receive data under a control of the processor; the processor is configured to read the computer program in the memory to perform:

receiving a first message sent by a Parallel or Supplanting System (PSS), where the first message includes a first information's identification and a first information's extraction method;

collecting information according to the first information's identification and the first information's extraction method, and determining an information collection report, where the information collection report includes an NE collected information's identification, an NE collected information's extraction method, and an NE collected information's content; and sending the information collection report to the PSS, to enable the PSS to determine, based on the NE collected information's identification, the NE collected information's extraction method and the NE collected information's content, a correctness of the first information's identification and a correctness of the first information's extraction method, and distributing the information content with a correct identification and a correct extraction method to the corresponding internal functional unit.

In a fifth aspect, an information processing device is provided, applied to a Parallel or Supplanting System (PSS), including:

a first processing unit, configured to, based on an internal function unit's requirement description for first information's content, send a first message to a network element (NE), where the first message includes a first information's identification and a first information's extraction method, to enable the NE to collect information according to the first information's identification and the first information's extraction method;

a second processing unit, configured to receive an information collection report sent by the NE, where the information collection report includes an NE collected information's identification, an NE collected information's extraction method, and an NE collected information's content; and a third processing unit, configured to, based on the NE collected information's identification, the NE collected information's extraction method and the NE collected information's content, determine a correctness of the first information's identification and a correctness of the first information's extraction method, and distribute the information content with a correct identification and a correct extraction method to the corresponding internal functional unit.

In a sixth aspect, an information processing device is provided, applied to a Network Element (NE), including:

a fourth processing unit, configured to receive a first message sent by a Parallel or Supplanting System (PSS), where the first message includes a first information's identification and a first information's extraction method;

a fifth processing unit, configured to collect information according to the first information's identification and the first information's extraction method, and determining an information collection report, where the information collection report includes an NE collected information's identification, an NE collected information's extraction method, and an NE collected information's content; and a sixth processing unit, configured to the information collection report to the PSS, to enable the PSS to determine, based on the NE collected information's identification, the NE collected information's extraction method and the NE collected information's content, a correctness of the first information's identification and a correctness of the first information's extraction method, and distributing the information content with a correct identification and a correct extraction method to the corresponding internal functional unit.

In a seventh aspect, a processor-readable storage medium is provided. The processor-readable storage medium stores a computer program, and the computer program is configured to enable the processor to perform the method in the first or second aspect.

The technical solutions provided by the embodiments of the present disclosure have at least the following beneficial effects:

Provides a new method for multiple external modules lay in the PSS to extract the first information's content simultaneously. On the PSS-NE interface, the signaling overhead is reduced, and the information capacity of the PSS-NE interface is increased. Inside the NE, the processing complexity is reduced, and the overall efficiency of the NE is optimized.

Additional aspects and advantages of the disclosure will be set forth in part in the following description, and will become apparent from the description, or may be learned by practice of the disclosure.

BRIEF DESCRIPTION OF THE DRAWINGS

In order to illustrate the technical solutions in the embodiments of the present disclosure more clearly, the following will briefly introduce the drawings used in the description of the embodiments of the present disclosure.

DETAILED DESCRIPTION

Figure 1:
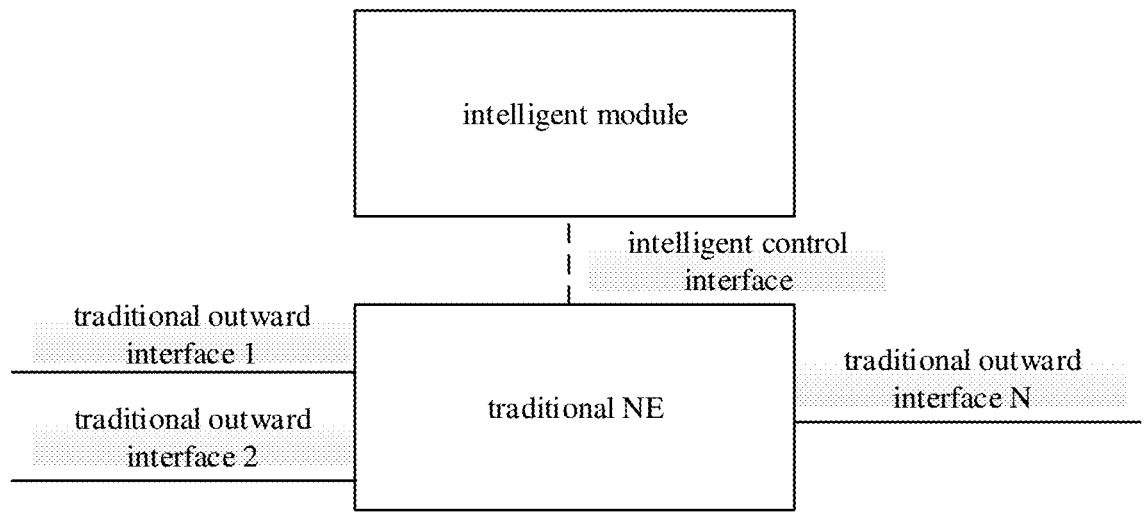
FIG. 1 is a schematic diagram of a network architecture in the prior art.
Figure 2:
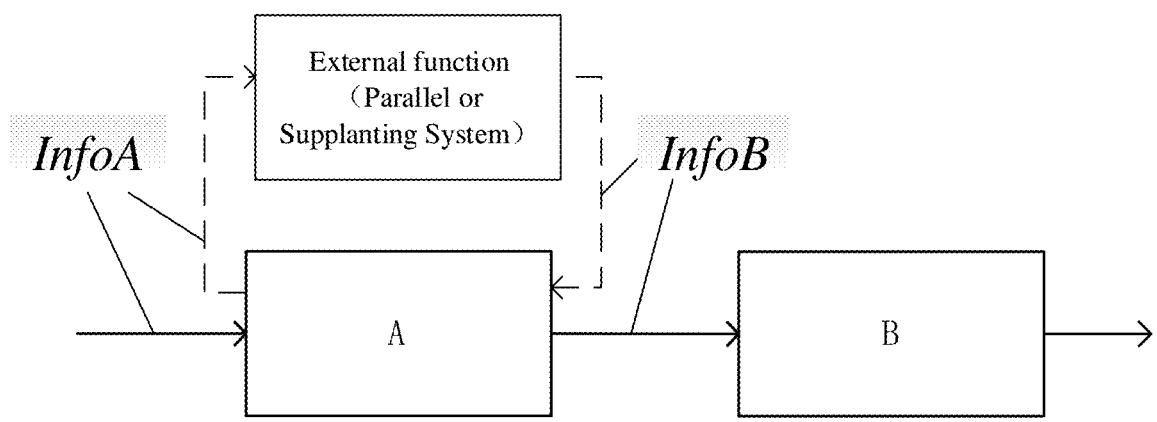
FIG. 2 is a schematic diagram of a network architecture in the prior art.

The present disclosure is described in detail below, examples of which are illustrated in the drawings, in which the same or similar reference numerals denote the same or similar elements or elements having the same or similar functions throughout. The embodiments described below by referring to the figures are exemplary only for explaining the present disclosure and cannot be construed as limiting the present disclosure.

Those skilled in the art can understand that unless otherwise stated, the singular forms "a", "an", "the" and "the" used herein may also include plural forms. It should be further understood that the word "including" used in the specification of the present disclosure refers to the presence of the stated features, integers, steps, operations, elements and/or components, but does not exclude the presence or addition of one or more other features, Integers, steps, operations, elements, components, and/or groups thereof. It will be understood that when an element is referred to as being "connected" or "coupled" to another element, it can be directly connected or coupled to the other element or intervening elements may also be present. Additionally, "connected" or "coupled" as used herein may include wireless connection or wireless coupling. The expression "and/or" used herein includes all or any elements and all combinations of one or more associated listed items.

/or" in the embodiments of the present disclosure describes the association relationship of associated objects, indicating that there may be three relationships, for example, A and/or B, which can mean: A exists alone, A and B exist simultaneously, and there exists alone B these three situations. The character "/" generally indicates that the contextual objects are an "or" relationship. The term "plurality" in the embodiments of the present disclosure refers to two or more, and other quantifiers are similar.

In order to better understand and illustrate the solutions of the embodiments of the present disclosure, some technical terms involved in the embodiments of the present disclosure will be briefly described below.

Figure 3:
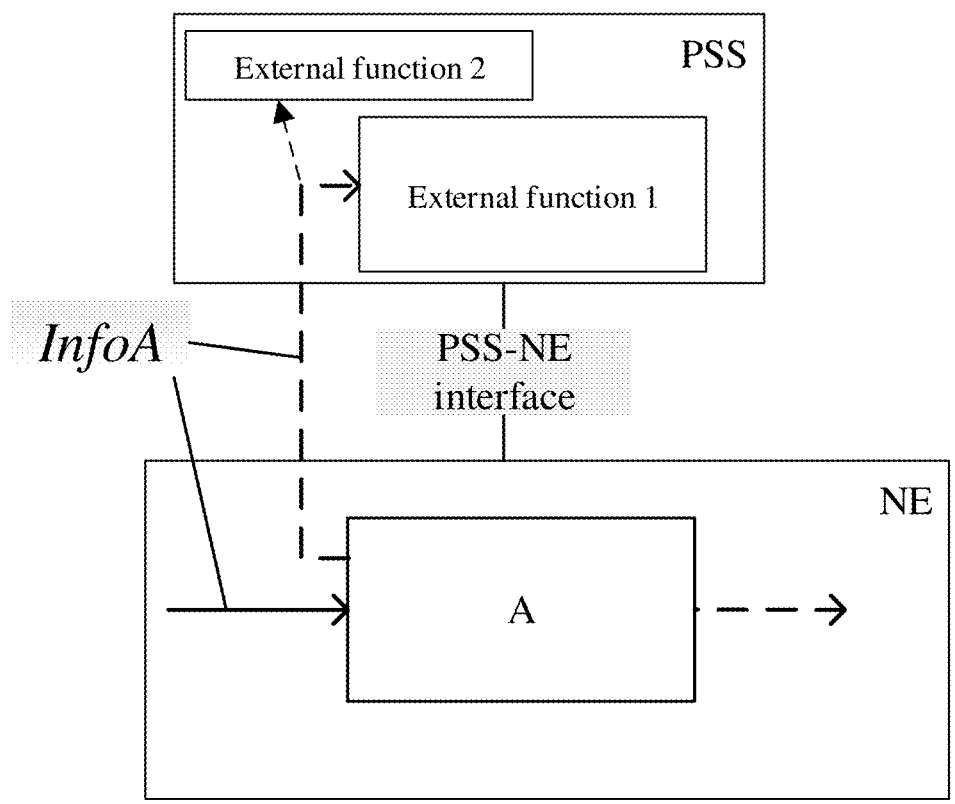
FIG. 3 is a schematic diagram of a network architecture in an embodiment of the present disclosure.

When multiple algorithms, functions, and applications are integrated in the PSS, it will encounter the situation that multiple algorithms, functions, and applications need one or a group of information with the same name at the same time. As shown in FIG. 3, the external module 1 lay in the PSS is extracting Information info A, another external module 2 lay in the PSS also needs to extract info A in the PSS, that is, the external function 1 and the external function 2 need to extract one or a group of information with the same name at the same time.

The embodiments of the present disclosure will be clearly and completely described below in conjunction with the accompanying drawings in the embodiments of the present disclosure. Obviously, the described embodiments are only part of the embodiments of the present disclosure, not all of them. Based on the embodiments in the present disclosure, all other embodiments obtained by persons of ordinary skill in the art without making creative efforts belong to the protection scope of the present disclosure.

Figure 4:
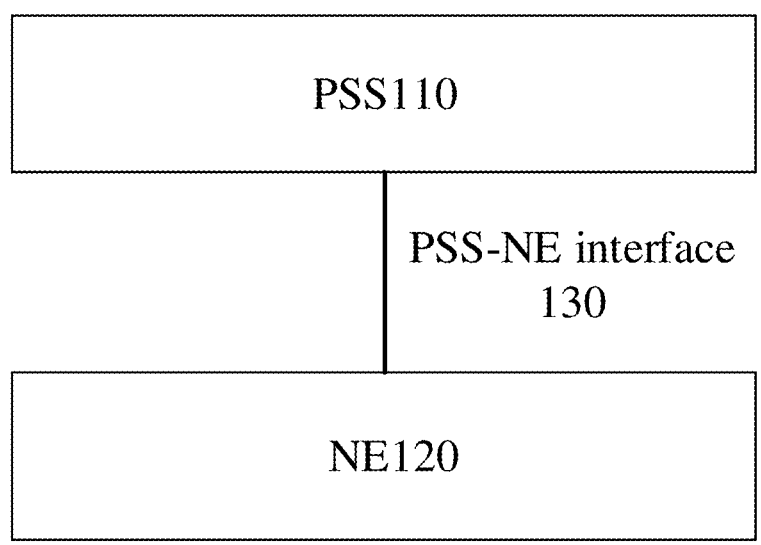
FIG. 4 is a schematic diagram of a network architecture in an embodiment of the present disclosure.

A schematic diagram of a network architecture in an embodiment of the present disclosure is shown in FIG. 4. The network architecture includes: PSS and NE, where the PSS is, for example, the PSS110 in FIG. 4, and the NE is, for example, the NE 120 in FIG. 4. NE is deployed in the current network, such as the access network, core network, and transmission network. For example, NE 120 is deployed in the access network NG-RAN (New Generation Radio Access Network) in the 5G system. The PSS and NE communicate with each other through the PSS-NE interface, such as the PSS-NE interface 130 in FIG. 4. The PSS is an external parallel or supplanted processing device that implements the internal functions of the NE, and the NE is generally a network node.

The network node in the present disclosure may be a base station, and the base station may include multiple cells that provide services for UE. According to different specific application scenarios, the base station may also be called an access point, or may be a device in the access network that communicates with the UE through one or more sectors on the air interface, or other names. The network node can be used to interchange received over-the-air frames with Internet Protocol (IP) packets, acting as a router between the UE and the rest of the access network, which can include IP communication network. The network nodes may also coordinate attribute management for the air interface. For example, the network node involved in the embodiments of the present disclosure may be a Base Transceiver Station (BTS), it can also be a base station equipment (NodeB) in Wide-band Code Division Multiple Access (WCDMA), or it can be an evolved base station device (evolved Node B, eNB or e-NodeB) in a long term evolution (LTE) system, a 5G base station (gNB) in a 5G system, or a home evolved base station (HeNB), a relay node, Home base station (femto cell), pico base station (pico cell), etc., are not limited in the embodiments of the present disclosure. In some network structures, network nodes may include centralized unit (CU) nodes and distributed unit (DU) nodes, and the centralized unit and distributed unit may also be arranged geographically separately.

In order to make the purpose, technical solution and advantages of the present disclosure more clear, the implementation manners of the present disclosure will be further described in detail below in conjunction with the accompanying drawings.

Figure 5:
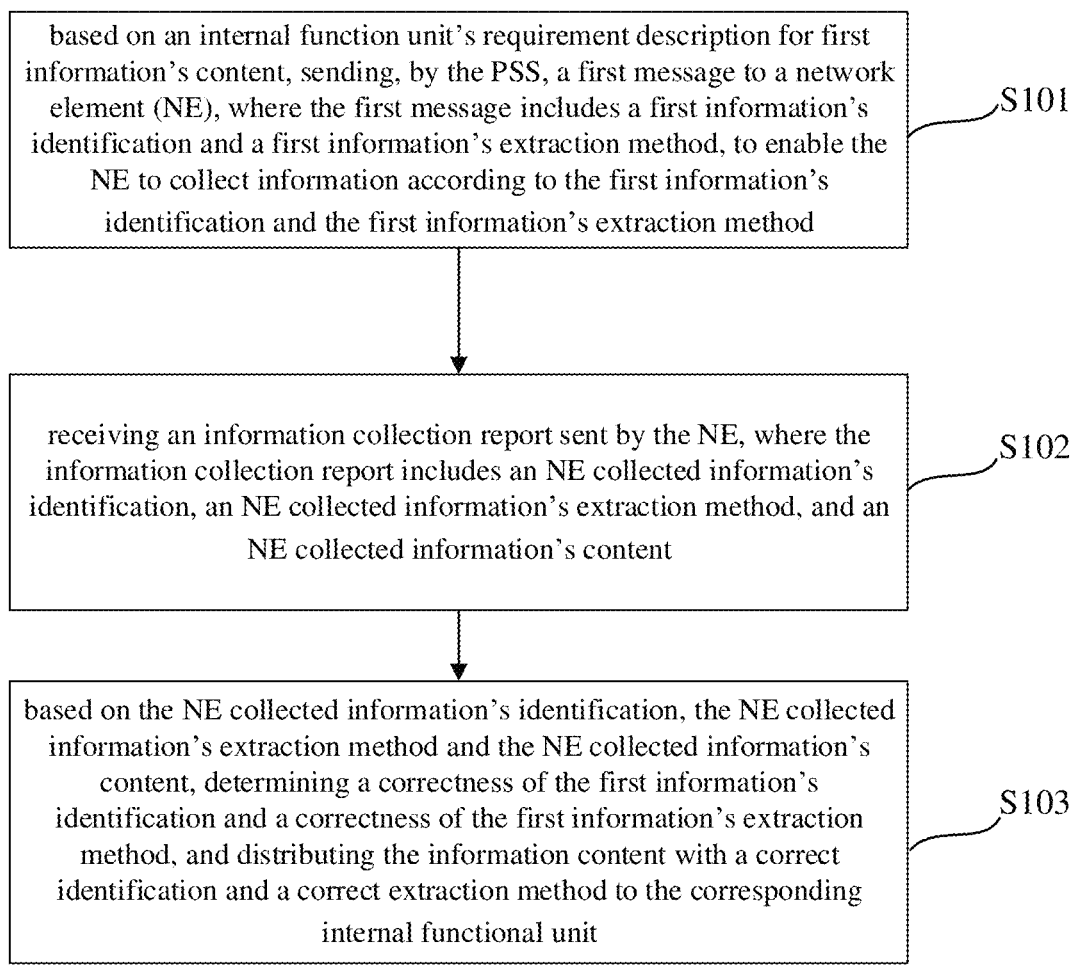
FIG. 5 is a schematic flowchart of an information processing method in an embodiment of the present disclosure.

The present disclosure provides an information processing method, which is executed by a parallel or supplanted system PSS. The schematic flow chart of the method is shown in FIG. 5, and the method includes:

Step S101: based on an internal function unit's requirement description for first information's content, sending, by the PSS, a first message to a network element (NE), where the first message includes a first information's identification and a first information's extraction method, to enable the NE to collect information according to the first information's identification and the first information's extraction method.

In an embodiment, the requirement description for the first information includes at least one of a demander's identification of the first information, the first information's identification, and the first information's extraction method;

in a case that the NE is acknowledged being able to collect information according to the first information's identification and the first information's extraction method, storing, by the PSS, the requirement description for the first information's content, to form one new record in an information distribution description table;

in a case that the NE is acknowledged being able to collect information according to the first information's identification and the first information's extraction method, storing, by the PSS, the first information's identification and the first information's extraction method included in the first message to form one new record in an information extraction description table.

In an embodiment, the sending the first message to the network element (NE) includes:

when the first information's identification is the same as a second information's identification in an information extraction description table, and the first information's extraction method is the same as a second information's extraction method, not sending the first message to network element (NE);

or when the first information's identification is the same as a second information's identification in an information extraction description table, and the first information's extraction method is different from second information's extraction methods, and the first information's extraction method belongs to one of the second information's extraction methods, not sending the first message to network element (NE);

or when the first information's identification is the same as a second information's identification in an information extraction description table, and the first information's extraction method is different from second information's extraction methods, and one of the second information's extraction methods belongs to the first information's extraction method, sending the first message to the network element (NE), where the first message includes the first information's identification, the first information's extraction method and other second information's extraction methods that do not belong to the first information's extraction method; other second information's extraction methods that do not belong to the first information's extraction method are transmitted in the first message in an explicit manner through a full configuration method or in an implicit manner through a delta configuration method;

or when the first information's identification is the same as a second information's identification in an information extraction description table, and the first information's extraction method is different from second information's extraction methods, and any of the second information's extraction methods does not belong to the first information's extraction method and the first information's extraction method does not belong to any of the second information's extraction methods, sending the first message to the network element (NE), where the first message includes the first information's identification, the first information's extraction method and the second information's extraction methods; the second information's extraction methods in the first message are transmitted in the first message in an explicit manner through a full configuration method or in an implicit manner through a delta configuration method.

In an embodiment, the forming the new record of the information extraction description table includes:

when the first information's identification is the same as the second information's identification in the information extraction description table, and the first information's extraction method is the same as one of second information's extraction methods, remaining the information extraction description table in status quo, without any update;

or when the first information's identification is the same as a second information's identification in an information extraction description table, and the first information's extraction method is different from second information's extraction methods, and the first information's extraction method belongs to one of the second information's extraction methods, remaining the information extraction description table in status quo, without any update;

or when the first information's identification is the same as a second information's identification in an information extraction description table, and the first information's extraction method is different from second information's extraction methods, and one of the second information's extraction methods belongs to the first information's extraction method, updating the information extraction description table to obtain an updated information extraction description table, where the updated information extraction description table includes the first information's identification, the first information's extraction method and other second information's extraction methods that do not belong to the first information's extraction method;

or when the first information's identification is the same as a second information's identification in an information extraction description table, and the first information's extraction method is different from second information's extraction methods, and any of the second information's extraction methods does not belong to the first information's extraction method and the first information's extraction method does not belong to any one of the second information's extraction methods, updating the information extraction description table to obtain an updated information extraction description table, where the updated information extraction description table includes the first information's identification, the first information's extraction method, and the second information's extraction methods.

Step S102: receiving an information collection report sent by the NE, where the information collection report includes an NE collected information's identification, an NE collected information's extraction method, and an NE collected information's content.

Step S103: based on the NE collected information's identification, the NE collected information's extraction method and the NE collected information's content, determining a correctness of the first information's identification and a correctness of the first information's extraction method, and distributing the information content with a correct identification and a correct extraction method to the corresponding internal functional unit.

In an embodiment, the based on the NE collected information's identification, the NE collected information's extraction method and the NE collected information's content, determining the correctness of the identification and the correctness of the first information's extraction method, and distributing the information content with a correct identification and a correct extraction method to the corresponding internal functional unit includes:

when the NE collected information's identification is the same as the first information's identification included in the information distribution description table, and the NE collected information's extraction method is the same as at least one of the first information's extraction method included in the information distribution description table, determining the NE collected information's content as the first information's content, and transmitting the first information's content to a corresponding functional unit which is marked with the same extraction method in the information distribution description table; or when the NE collected information's identification is the same as the first information's identification included in the information distribution description table, and the NE collected information's extraction method is different from at least one of the first information's extraction method included in the information distribution description table, and the at least one of the first information's extraction method belongs to the NE collected information's extraction method, determining the NE collected information's content as the first information's content, and according to the requirement of all the first information's extraction method that belongs to the NE collected information's extraction method, transmitting the first information's content to a corresponding functional unit with the extraction method belonging to the NE collected information's extraction method in the information distribution description table.

In an embodiment, when the NE collected information's identification is different from the identifications of all the information recorded in the information distribution description table, the information collected by the NE is incorrect, and an error type is unsubscribed information; or when the NE collected information's identification is the same as the first information's identification included in the information distribution description table, and the NE collected information's extraction method is different from any one of the first information's extraction methods included in the information distribution description table, and any one of the first information's extraction methods does not belong to the NE collected information's extraction method, the information collected by the NE is incorrect, and an error type is unsubscribed extraction method.

In one embodiment, the information extraction description table of the PSS could be an IADV (Information Abstraction Description Vector), which describes current information subscriptions on the PSS-NE interface. The form of the IADV could be as {request to be extracted information's identification, the information extraction method}, where the request to be extracted information's identification could be the second information' identification, and the method of information extraction could be the second information's extraction method. The information distribution description table could be IDDV (Information Distribution Description Vector), which describes the matching and distribution relationship between the information content report on the PSS-NE interface received by the PSS and the internal functional units of the PSS. The form of IDDV could be {PSS internal functional unit's identification, required information's identification, required information's extraction method}.

For example, the PSS internal function identification is used to uniquely identify an extractor, and could possible take forms of module name, module ID, etc. The identification of the information required to be extracted and the identification of the required information are used to uniquely identify one or a group of information needs extracted, and could possible take forms of information name, information ID and so on. The way of information extraction and the way of extracting the required information are used to uniquely identify in which condition shall the information being extracted, and could possible take forms of the requirements in timing (such as periodic extraction), or the requirements under a certain premise (such as the value of a certain element meet a certain threshold).

According to the present disclosure, multiple functional units of PSS may extract the first information's content simultaneously. On the PSS-NE interface, the signaling overhead is reduced, and the information capacity of the PSS-NE interface is increased. Inside the NE, the processing complexity is reduced, and the overall efficiency of the NE is optimized.

Figure 6:
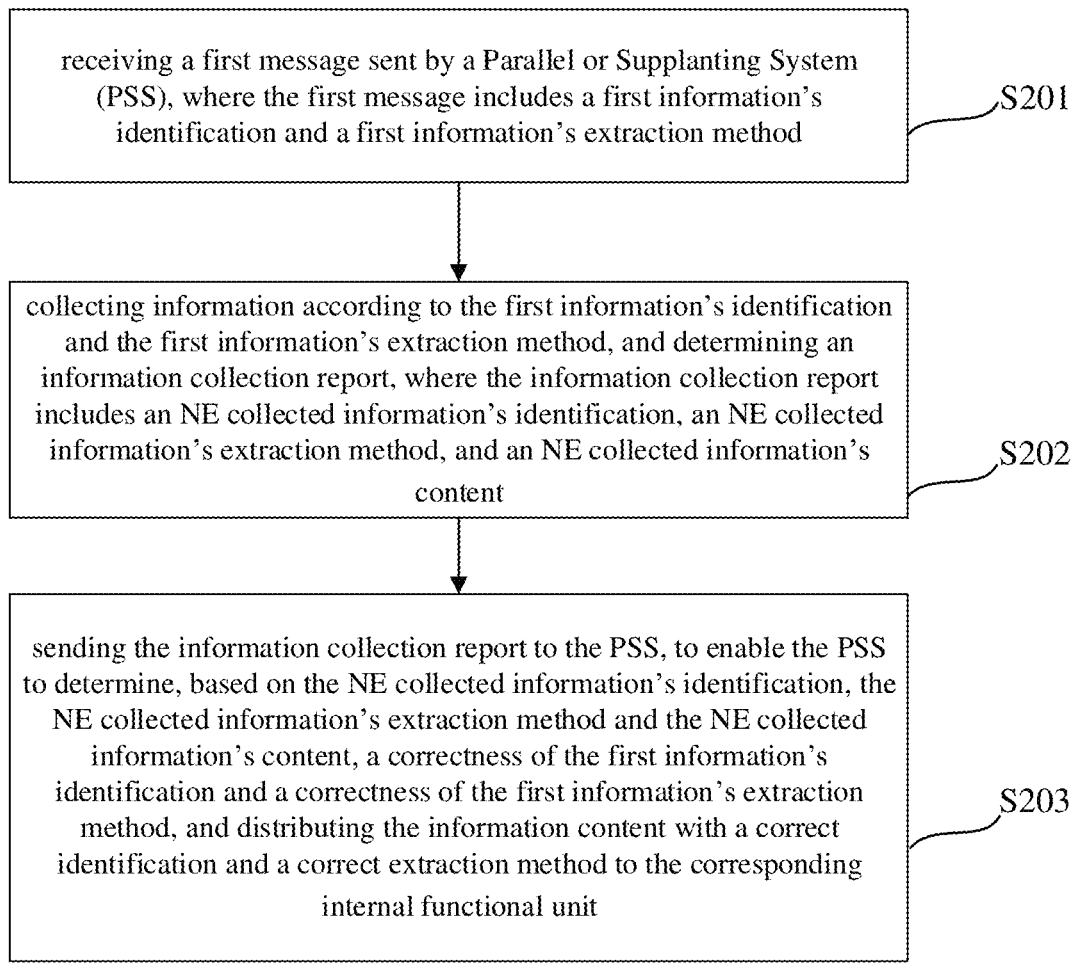
FIG. 6 is a schematic flowchart of another information processing method in an embodiment of the present disclosure.

The present disclosure provides another information processing method, which is executed by NE. The schematic flowchart of the method is shown in FIG. 6, and the method includes:

Step S201: receiving a first message sent by a Parallel or Supplanting System (PSS), where the first message includes a first information's identification and a first information's extraction method.

Step S202: collecting information according to the first information's identification and the first information's extraction method, and determining an information collection report, where the information collection report includes an NE collected information's identification, an NE collected information's extraction method, and an NE collected information's content.

Step S203, sending the information collection report to the PSS, to enable the PSS to determine, based on the NE collected information's identification, the NE collected information's extraction method and the NE collected information's content, a correctness of the first information's identification and a correctness of the first information's extraction method, and distributing the information content with a correct identification and a correct extraction method to the corresponding internal functional unit.

According to the present disclosure, multiple functional units of the parallel or supplanted system PSS can extract the first information's content simultaneously. On the PSS-NE interface, the signaling overhead is reduced, and information capacity of the PSS-NE interface is increased. Inside the NE, the processing complexity is reduced and the overall efficiency of the NE is optimized.

The present disclosure is introduced comprehensively and in detail through the following embodiments.

In the First Aspect of the Present Disclosure: New External Functionality in PSS Requires Extraction of Same-Named Information.

In one embodiment, when the PSS has the IADV {request to be extracted information's identification: X1, the method of information extraction: S1}, and the IDDV {PSS internal functional unit's identification: ID1, required information's identification: X1, required information's extraction method: S1} and there is a second PSS internal function requests to extract information X1, where, ID1 can be the function unit's identification, and X1 can be the second information's identification, S1 can be the second information's extraction method, and the same-named information can represent the content of the same information; it includes:

(1) The xAPP whose function ID is ID1' sends to other support functions inside the PSS an information extraction requirement description {request to be extracted information's identification: X1', information extraction method: S1'} (ID1' is omitted here); the xAPP whose function identification is ID1' is a new internal function of the PSS; the identification X1' of the information required to be extracted could be the first information's identification, and the information extraction method S1' could be the first information's extraction method.

(2) Other supported functions inside the PSS check the stored IADV.

Determine that X1'=X1. (It means that the two PSS internal functions require to extract information with the same name)

(3) The two situations continued from the PSS check the information extraction method are as follows:

S1'=S1; (representing that the information extraction methods are the same)

S1'!=S1. (representing that the information extraction methods are different)

(4) When S1'=S1, PSS does not need to initiate the PSS-NE interface action, and updates the saved IDDV {PSS internal function identification: ID1, request to be extracted information's identification: X1, information extraction method: S1} to IDDV' {PSS internal function identification: ID1, ID1', request to be extracted information's identification: X1, information extraction methods: S1, S1}. There will be no change to the saved IADV in the PSS.

(5) When S1'!=S1, the PSS initiates a subscription update operation of the PSS-NE interface.

The message sent by the PSS should indicate that the extraction method of X1 is changed. For example, a possible implementation is as follows:

For info X1; (for X1)

When S1∪S1'; (representing when S1' or S1)

Do NE collect X1 and send it to PSS. (representing that NE collects X1 and sends X1 to PSS)

When the NE replies that the subscription relationship has been successfully updated, the PSS will update the saved IDDV{PSS internal function identification: ID1, the required information's identification: X1, the required information's extraction method: S1} to IDDV' {PSS internal function identification: ID1, ID1', the required information's identification: X1, the required information's extraction methods: S1, S1'}. The external function identifications and information extraction methods are linked with each other in sequence, for example, ID1 and S1 are valid link, and ID1' and S1' are valid link.

When the NE replies that the update of the subscription relationship is successful, the PSS will update the saved IADV {the required information's identification: X1, the required information's extraction method: S1} to {the required information's identification: X1, the required information's extraction method: S1∪S1'}.

(6) There are some specific situations, for example, S1∈S1' (means that the new extraction method satisfies the recorded extraction method too), because S1∈S1', so S1∪S1'=S1', then when PSS initiates PSS-NE interface subscription update operation, there will be a more concise way, such as a possible implementation, as follows:

For info X1; (for X1)

When S1'; (representing when S1')

Do NE collect X1 and send it to PSS. (representing that NE collects X1 and sends X1 to PSS)

the NE replies that the subscription relationship has been successfully updated, the PSS will update the saved IDDV{PSS internal function identification: ID1, the required information's identification: X1, the required information's extraction method: S1} to IDDV' {PSS internal function identifications: ID1, ID1', the required information's identification: X1, the required information's extraction methods: S1, S1'}. The external function identifications and information extraction methods are linked with each other in sequence, for example, ID1 and S1 are valid link, and ID1' and S1' are valid link.

When the NE replies that the update of the subscription relationship is successful, the PSS updates the saved IADV {the required information's identification: X1, the required information's extraction method: S1} to {the required information's identification: X1, the required information's extraction method: S1'}.

(7) There are some specific situations, for example, S1'∈S1 (meaning that the recorded extraction method also satisfies the new extraction method), because S1'∈S1, so S1∪S1'=S1, then PSS does not need to initiate PSS-NE interface subscribe update operation.

PSS updates the saved IDDV {PSS internal function identification: ID1, the required information's identification: X1, the required information's extraction method: S1} to IDDV' {PSS internal function identifications: ID1, ID1', the required information's identification: X1, the required information's extraction methods: S1, S1'}.

There is no change to the saved IADV in the PSS.

Figure 7:
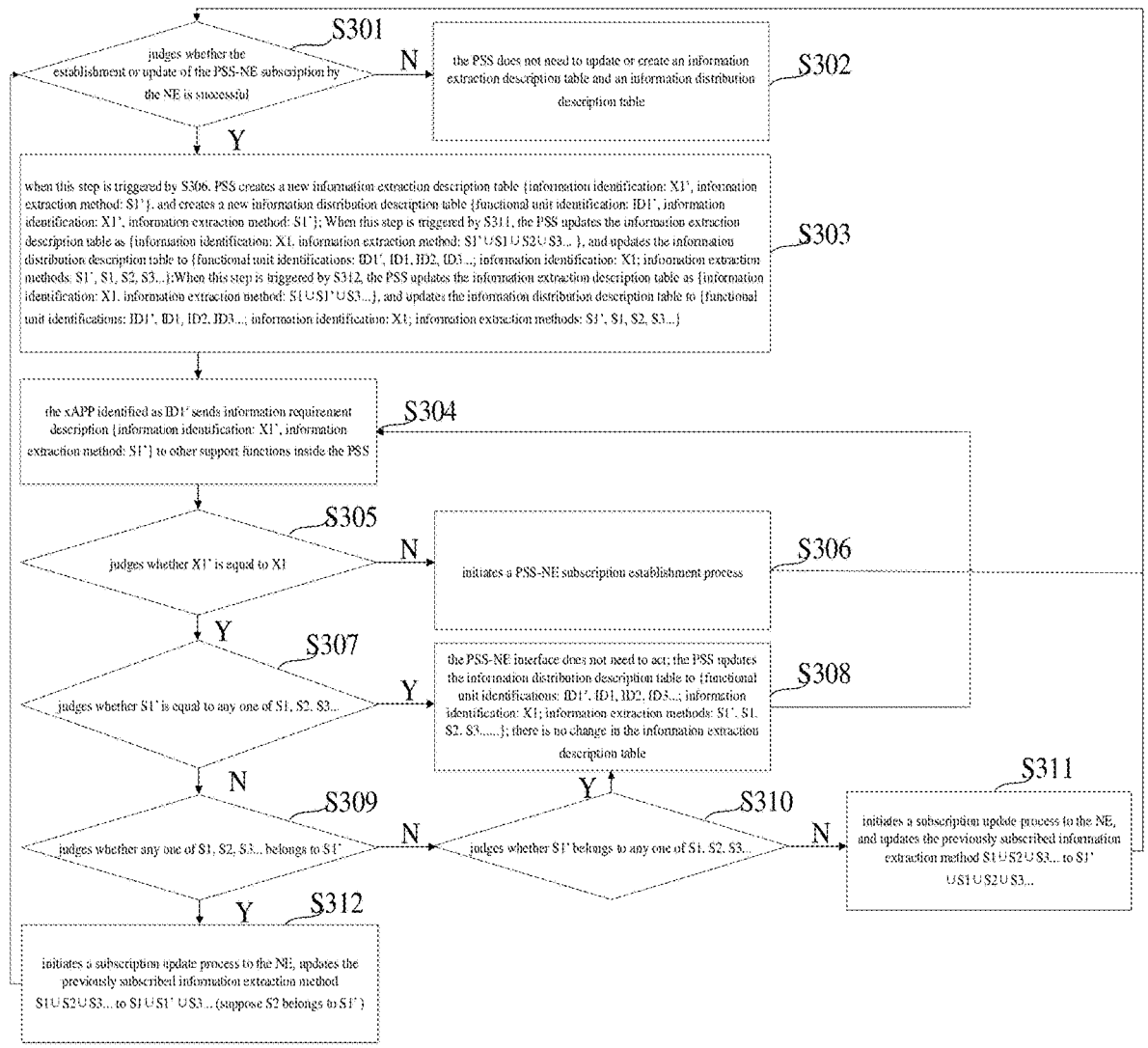
FIG. 7 is a schematic flowchart of another information processing method in an embodiment of the present disclosure.

The present disclosure provide yet another information processing method, a schematic flowchart of the method is shown in FIG. 7, and the method includes:

Step S301, judges whether the establishment or update of the PSS-NE subscription by the NE is successful; when the establishment or update of the PSS-NE subscription by the NE is successful, proceeding to step S303; otherwise, proceeding to step S302.

Step S302, the PSS does not need to update or create an information extraction description table and an information distribution description table.

Step S303, when this step is triggered by S306, PSS creates a new information extraction description table {information identification: X1', information extraction method: S1'}, and creates a new information distribution description table {functional unit identification: ID1', information identification: X1', information extraction method: S1'};

When this step is triggered by S311, the PSS updates the information extraction description table as {information identification X1, information extraction method S1'∪S1∪S2∪S3 . . . }, and updates the information distribution description table to {functional unit identifications: ID1', ID1, ID2, ID3 . . . ; information identification: X1; information extraction methods: S1', S1, S2, S3 . . . };

When this step is triggered by S312, the PSS updates the information extraction description table as {information identification: X1, information extraction method: S1∪S1'∪S3 . . . }, and updates the information distribution description table to {functional unit identifications: ID1', ID1, ID2, ID3 . . . ; information identification: X1; information extraction methods: S1', S1, S2, S3 . . . }.

Step S304, the xAPP identified as ID1' sends information requirement description {information identification: X1', information extraction method: S1'} to other supported functions inside the PSS.

Step S305, judges whether X1' is equal to X1; if X1' is not equal to X1, proceed to step S306; if X1' is equal to X1, proceeding step S307.

Step S306, initiates a PSS-NE subscription establishment process, and returning to step S301.

Step S307, judges whether S1' is equal to any one of S1, S2, S3 . . . ; when S1' is equal to any one of S1, S2, S3 . . . , proceeding to step S308; when S1' is not equal to any one of S1, S2, S3 . . . , proceeding to step S309.

Step S308, the PSS-NE interface does not need to act; the PSS updates the information distribution description table to {functional unit identifications: ID1', ID1, ID2, ID3 . . . ; information identification: X1; information extraction methods: S1', S1, S2, S3}; there is no change in the information extraction description table.

Step S309, judges whether any one of S1, S2, S3 . . . belongs to S1'; when any one of S1, S2, S3 . . . does not belong to S1', proceeding to step S310; when any one of S1, S2, S3 . . . belongs to S1', proceeding to step S312.

Step S310, judges whether S1' belongs to any one of S1, S2, S3 . . . ; when S1' belongs to any one of S1, S2, S3 . . . , proceeding to step S308; when S1' does not belong to any one of S1, S2, S3 . . . , proceeding to step S311.

Step S311, initiates a subscription update process to the NE, and updates the previously subscribed information extraction method S1∪S2∪S3 . . . to S1'∪S1∪S2∪S3 . . . ; step S311 returns to step S301.

Step S312, initiates a subscription update process to the NE, updates the previously subscribed information extraction method S1∪S2∪S3 . . . to S1∪S1'∪S3 . . . (suppose S2 belongs to S1'); step S312 returns to step S301.

In Embodiment 1 of the Present Disclosure

ID1=LBC based HO trigger (handover trigger function based on load balancing), X1=LBC specific RAN para in cell1 (RAN load information of cell cell1), S1=periodic report with period of 1024 ms (periodically reporting LBC specific RAN para in cell1 with period of 1024 ms).

ID1'=LBC based RAC (wireless access control function based on load balancing), X1=LBC specific RAN para in cell1 (RAN load information of cell cell1), S1'=periodic report with period of 1024 ms (periodically reporting LBC specific RAN para in cell1 with period of 1024 ms).

Since S1=S1', PSS does not need to initiate a subscription update operation on the PSS-NE interface; at the same time, PSS updates IDDV {LBC based HO trigger, LBC specific RAN para in cell1, periodic report with period of 1024 ms} to IDDV'{LBC based HO trigger, LBC based RAC; LBC specific RAN para in cell1; periodic report with period of 1024 ms}; IADV {LBC specific RAN para in cell1, periodic report with period of 1024 ms} stored in the PSS remains unchanged.

In Embodiment 2 of the Present Disclosure

ID1=LBC based HO trigger (handover trigger function based on load balancing), X1=LBC specific RAN para in cell1 (RAN load information of cell cell1), S1=periodic report with period of 1024 ms (periodically reporting LBC specific RAN para in cell1 with period of 1024 ms).
ID1'=LBC based RAC (radio access control function based on load balancing), X1=LBC specific RAN para in cell1 (RAN load information of cell1), S1'=periodic report with period of 512 ms (periodically reporting LBC specific RAN para in cell1 with period of 512 ms).
S1!=S1', and S1∈S1', (that is, the reporting period of 512 ms meets the requirement of 1024 ms); therefore:
1) PSS triggers the update process of PSS-NE interface information subscription, and updates PSS-NE interface information subscription {LBC specific RAN para in cell1, periodic report with period of 1024 ms} to PSS-NE interface information subscription {LBC specific RAN para in cell1, periodic report with period of 512 ms}, NE reports that the subscription relationship has been updated successfully;
2) PSS updates IDDV{LBC based HO trigger, LBC specific RAN para in cell1, periodic report with period of 1024 ms} to IDDV' {LBC based HO trigger, LBC based RAC; LBC specific RAN para in cell1; periodic report with period of 1024 ms, periodic report with period of 512 ms}; PSS simultaneously updates IADV{LBC specific RAN para in cell1, periodic report with period of 1024 ms} to IADV' {LBC specific RAN para in cell1, periodic report with period of 512 ms};
3) The NE executes the collection process of LBC specific RAN para in cell1, and informs the PSS of the information collection report.

In Embodiment 3 of the Present Disclosure

ID1=LBC based HO trigger (handover trigger function based on load balancing), X1=LBC specific RAN para in cell1 (RAN load information of cell cell1), S1=periodic report with period of 1024 ms (periodically reporting LBC specific RAN para in cell1 with period of 1024 ms).
ID1'=LBC based RAC (radio access control function based on load balancing), X1=LBC specific RAN para in cell1 (RAN load information of cell cell1), S1'=when served UE number is more than 80 (when the number of served UEs exceeds 80, immediately report LBC specific RAN para in cell1).
S1!=S1', and S1!∈S1' and S1'!∈S1 (that is, the reporting interval of 1024 ms is not necessarily related to the number of served UEs exceeding 80); therefore:
1) PSS triggers the update process of PSS-NE interface information subscription, and updates {LBC specific RAN para in cell1, periodic report with period of 1024 ms} to {LBC specific RAN para in cell1, periodic report with period of 1024 ms or when served UE number is more than 80}, NE reports that the subscription relationship has been updated successfully;
2) PSS updates IDDV {LBC based HO trigger, LBC specific RAN para in cell1, periodic report with period of 1024 ms} to IDDV' {LBC based HO trigger, LBC based RAC; LBC specific RAN para in cell1; periodic report with period of 1024 ms, when served UE number is more than 80}; PSS simultaneously updates IADV {LBC specific RAN para in cell1, periodic report with period of 1024 ms} to IADV' {LBC specific RAN para in cell1, periodic report with period of 1024 ms or when the number of served UE is more than 80};
3) NE performs a collection of LBC specific RAN para in cell1 and informs the PSS of the information collection report.

In a Second Aspect of the Present Disclosure: PSS Refers to IDDV Records for Distribution of Extracted Information's Report In one embodiment, the NE collects information according to the requirements of the PSS, and sends an information collection report to the PSS.

In an embodiment, the information collection report sent by the NE includes at least {information identification: X1, collection method: S1, information X1's content Y1}.

In one embodiment, the PSS first checks whether X1 is recorded in the required information's identification entry of IDDV {PSS internal functional unit's identification, the required information's identification, the required information's extraction method}. That is, for X1, at least one record in IDDV {PSS internal functional unit's identification: ID1, required information's identification: X1', required information's extraction method: S1'} satisfies X1=X1'; no record in IDDV satisfies X1=X1', that means the information reported by NE is incorrect, and the error type is unsubscribed information.

PSS then checks whether S1 is recorded in the extraction method entry of IDDV {PSS internal functional unit's identification, the required information's identification: X1, the required information's extraction method}. That is, for S1, at least one record in IDDV {PSS internal functional unit's identification: ID1, required information's identification: X1', required information's extraction method: S1'} satisfies S1=S1' or S1'∈S1. When S1'=S1, Y1 will be reported to the corresponding external function; when S1'∈S1, the information should be reported to the corresponding external function xAPP according to the requirements of S1'; when there is no above-mentioned relationship between S1' and S1, it means that the information reported by NE is incorrect, and the error type is an unsubscribed information extraction method.

Figure 8:
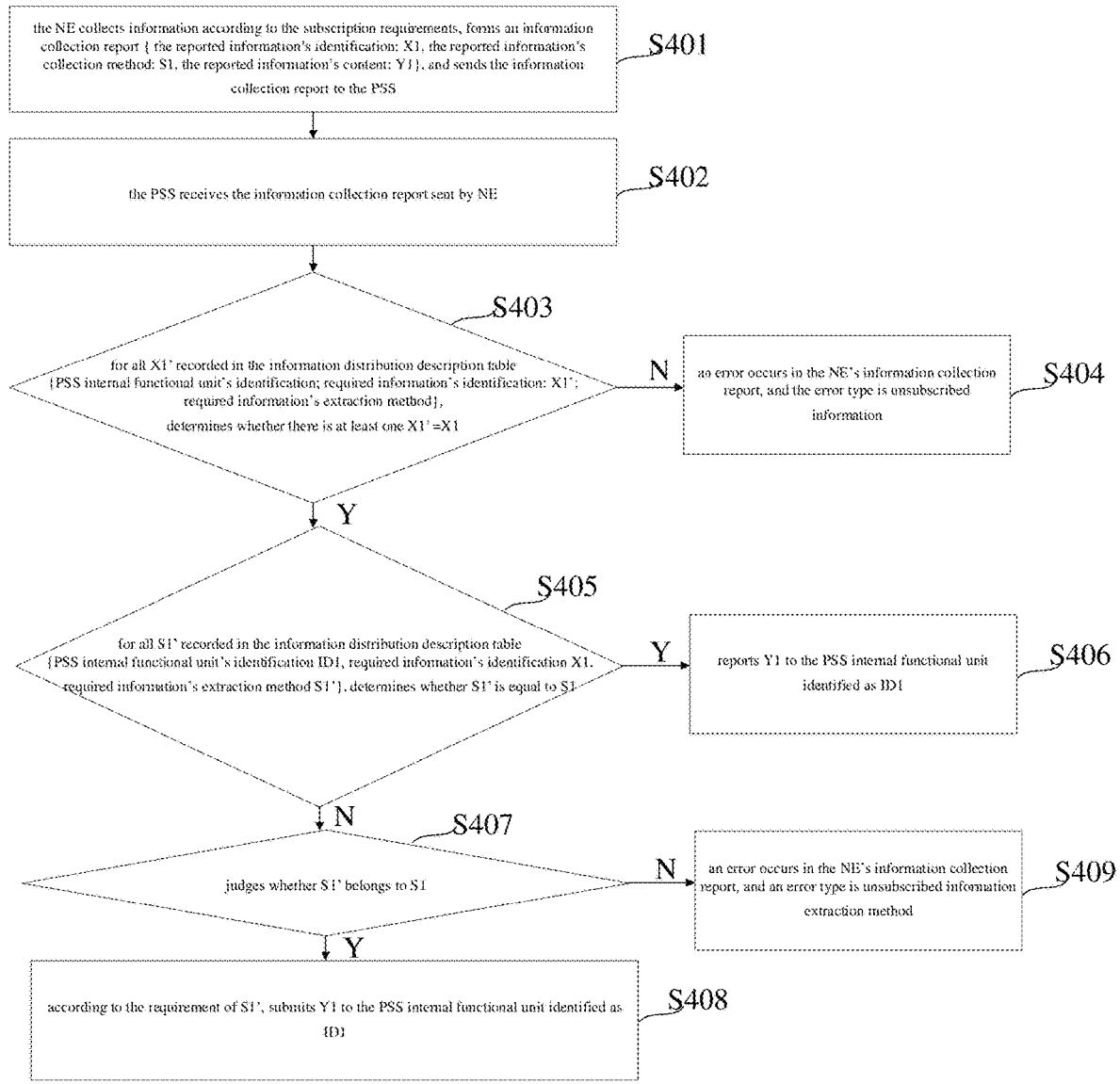
FIG. 8 is a schematic flowchart of another information processing method in an embodiment of the present disclosure.

The present disclosure provide yet another information processing method, a schematic flowchart of the method is shown in FIG. 8, and the method includes:

Step S401, the NE collects information according to the subscription requirements, forms an information collection report {the reported information's identification: X1, the reported information's collection method: S1, the reported information's content: Y1}, and sends the information collection report to the PSS.

Step S402, the PSS receives {information identification: X1, collection method: S1, information X1's content: Y1} included in the information collection report sent by NE.

Step S403, for all X1' recorded in the information distribution description table {PSS internal functional unit's identification, required information's identification: X1', required information's extraction method}, determines whether there is at least one X1'=X1; when there is no at least one X1'=X1, proceeding to step S404; when there is at least one X1'=X1, proceeding to step S405.

Step S404, an error occurs in the NE's information collection report, and the error type is unsubscribed information.

Step S405, for all S1' recorded in the information distribution description table {PSS internal functional unit's identification: ID1, required information's identification: X1, required information's extraction method: S1'}, determines whether S1' is equal to S1; if S1' is equal to S1, proceeding to step S406; if S1' is not equal to S1, proceeding to step S407.

Step S406, reports Y1 to the PSS internal functional unit identified as ID1.

Step S407, judges whether S1' belongs to S1; if S1' belongs to S1, proceeding to step S408; if S1' does not belong to S1, proceeding to step S409.

Step S408, according to the requirement of S1', submits Y1 to the PSS internal functional unit identified as ID1.

Step S409, an error occurs in the NE's information collection report, and the error type is an unsubscribed information extraction method.

In Embodiment 4 of the Present Disclosure

Embodiment 4 of the Present Disclosure is Proposed on the Basis of Embodiment 1 of the Present Disclosure.

NE sends {LBC specific RAN para in cell1; periodic report with period of 1024 ms; content=XXXX} included in the information collection report to PSS, and PSS obtains by querying the recorded IDDV: {LBC based HO trigger, LBC based RAC; LBC specific RAN para in cell1; periodic report with period of 1024 ms, periodic report with period of 1024 ms}; therefore, PSS distributes the received content=XXXX to two internal functions of PSS, LBC based HO trigger and LBC based RAC.

In Embodiment 5 of the Present Disclosure

Embodiment 5 of the Present Disclosure is Proposed on the Basis of Embodiment 2 of the Present Disclosure.

NE sends {LBC specific RAN para in cell1, periodic report with period of 512 ms, content=YYYY} included in the information collection report to PSS, and PSS obtains by querying the recorded IDDV: {LBC based HO trigger, LBC based RAC; LBC specific RAN para in cell1; periodic report with period of 1024 ms, periodic report with period of 512 ms}; therefore, PSS judges the time interval from the last report distributed to LBC based HO trigger and LBC based RAC, and remembers these two time intervals as t1, t2, respectively. If t1≈1024 ms, distribute content=YYYY to LBC based HO trigger; if t2≈512 ms, distribute content=YYYY to PSS internal function LBC based RAC.

In Embodiment 6 of the Present Disclosure

Embodiment 6 of the Present Disclosure is Proposed on the Basis of Embodiment 3 of the Present Disclosure.

NE sends {LBC specific RAN para in cell1, periodic report with period of 1024 ms, content=ZZZZ1} included in the information collection report to PSS, and PSS determines by querying the recorded IDDV: {LBC based HO trigger, LBC based RAC; LBC specific RAN para in cell1; periodic report with period of 1024 ms, when served UE number is more than 80}; therefore, PSS distributes the received content=ZZZZ1 to the PSS internal function LBC based HO trigger.

In Example 7 of the Present Disclosure

Embodiment 7 of the Present Disclosure is Proposed on the Basis of Embodiment 3 of the Present Disclosure.

The NE sends {LBC specific RAN para in cell1, when served UE number is more than 80, content=ZZZZ2} included in the information collection report to the PSS, and the PSS determines by querying the recorded IDDV: {LBC based HO trigger, LBC based RAC; LBC specific RAN para in cell1; periodic report with period of 1024 ms, when served UE number is more than 80}; therefore, the PSS distributes the received content=ZZZZ2 to the PSS internal function LBC based RAC.

The technical solutions provided by the embodiments of the present disclosure have at least the following beneficial effects:
    multiple functional units of PSS may extract the first information's content simultaneously. On the PSS-NE interface, the signaling overhead is reduced, and the information capacity of the PSS-NE interface is increased. Inside the NE, the processing complexity is reduced, and the overall efficiency of the NE is optimized.

Based on the same inventive concept, an embodiment of the present disclosure also provides an information processing device, which is applied to the PSS. The structural diagram of the device is shown in FIG. 9, the transceiver 1400 is configured to receive and send data under the control of the processor 1410.

Figure 9:
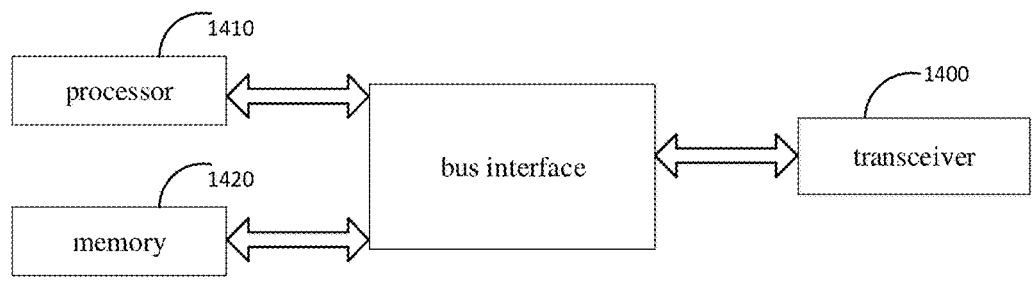
FIG. 9 is a schematic structural diagram of an information processing device in an embodiment of the present disclosure.

In FIG. 9, the bus architecture may include any number of interconnected buses and bridges, specifically one or more processors represented by the processor 14 10 and various circuits of the memory represented by the memory 14 20 are linked together. The bus architecture can also link together various other circuits such as peripherals, voltage regulators, and power management circuits, etc., which are well known in the art and therefore will not be further described herein. The bus interface provides the interface. Transceiver 1400 may be a plurality of elements, including a transmitter and a receiver, providing a unit for communicating with various other devices over transmission media, including wireless channels, wired channels, optical cables, and other transmission media. The processor 14 10 is responsible for managing the bus architecture and general processing, and the memory 14 20 may store data used by the processor 14 10 when performing operations.

The processors 14 and 10 may be CPUs, Application Specific Integrated Circuits (ASICs), Field Programmable Gate Arrays (FPGAs) or complex programmable logic devices (CPLD), the processor can also adopt a multi-core architecture.

The processor 1410 is configured to read the computer program in the memory and perform the following operations:
    based on an internal function unit's requirement description for first information's content, sending, by the PSS, a first message to a network element (NE), where the first message includes a first information's identification and a first information's extraction method, to enable the NE to collect information according to the first information's identification and the first information's extraction method;

receiving an information collection report sent by the NE, where the information collection report includes an NE collected information's identification, an NE collected information's extraction method, and an NE collected information's content; and based on the NE collected information's identification, the NE collected information's extraction method and the NE collected information's content, determining a correctness of the first information's identification and a correctness of the first information's extraction method, and distributing the information content with a correct identification and a correct extraction method to the corresponding internal functional unit.

In an embodiment, the requirement description for the first information includes at least one of a demander's identification of the first information, the first information's identification, and the first information's extraction method;

in a case that the NE is acknowledged being able to collect information according to the first information's identification and the first information's extraction method, storing the requirement description for the first information's content, to form one new record in an information distribution description table;

in a case that the NE is acknowledged being able to collect information according to the first information's identification and the first information's extraction method, storing the first information's identification and the first information's extraction method included in the first message to form one new record in an information extraction description table.

In an embodiment, the sending the first message to the network element (NE) includes:

when the first information's identification is the same as a second information's identification in an information extraction description table, and the first information's extraction method is the same as a second information's extraction method, not sending the first message to network element (NE);

or when the first information's identification is the same as a second information's identification in an information extraction description table, and the first information's extraction method is different from second information's extraction methods, and the first information's extraction method belongs to one of the second information's extraction methods, not sending the first message to network element (NE);

or when the first information's identification is the same as a second information's identification in an information extraction description table, and the first information's extraction method is different from second information's extraction methods, and one of the second information's extraction methods belongs to the first information's extraction method, sending the first message to the network element (NE), where the first message includes the first information's identification, the first information's extraction method and other second information's extraction methods that do not belong to the first information's extraction method; other second information's extraction methods that do not belong to the first information's extraction method are transmitted in the first message in an explicit manner through a full configuration method or in an implicit manner through a delta configuration method;

or when the first information's identification is the same as a second information's identification in an information extraction description table, and the first information's extraction method is different from second information's extraction methods, and any of the second information's extraction methods does not belong to the first information's extraction method and the first information's extraction method does not belong to any of the second information's extraction methods, sending the first message to the network element (NE), where the first message includes the first information's identification, the first information's extraction method and the second information's extraction methods; the second information's extraction methods in the first message are transmitted in the first message in an explicit manner through a full configuration method or in an implicit manner through a delta configuration method.

In an embodiment, the forming the new record of the information extraction description table includes:

when the first information's identification is the same as the second information's identification in the information extraction description table, and the first information's extraction method is the same as one of second information's extraction methods, remaining the information extraction description table in status quo, without any update;

or when the first information's identification is the same as a second information's identification in an information extraction description table, and the first information's extraction method is different from second information's extraction methods, and the first information's extraction method belongs to one of the second information's extraction methods, remaining the information extraction description table in status quo, without any update;

or when the first information's identification is the same as a second information's identification in an information extraction description table, and the first information's extraction method is different from second information's extraction methods, and one of the second information's extraction methods belongs to the first information's extraction method, updating the information extraction description table to obtain an updated information extraction description table, where the updated information extraction description table includes the first information's identification, the first information's extraction method and other second information's extraction methods that do not belong to the first information's extraction method;

or when the first information's identification is the same as a second information's identification in an information extraction description table, and the first information's extraction method is different from second information's extraction methods, and any of the second information's extraction methods does not belong to the first information's extraction method and the first information's extraction method does not belong to any one of the second information's extraction methods, updating the information extraction description table to obtain an updated information extraction description table, where the updated information extraction description table includes the first information's identification, the first information's extraction method, and the second information's extraction methods.

In an embodiment, the based on the NE collected information's identification, the NE collected information's extraction method and the NE collected information's content, determining the correctness of the identification and the correctness of the first information's extraction method, and distributing the information content with a correct identification and a correct extraction method to the corresponding internal functional unit includes:

when the NE collected information's identification is the same as the first information's identification included in the information distribution description table, and the NE collected information's extraction method is the same as at least one of the first information's extraction method included in the information distribution description table, determining the NE collected information's content as the first information's content, and transmitting the first information's content to a corresponding functional unit which is marked with the same extraction method in the information distribution description table; or when the NE collected information's identification is the same as the first information's identification included in the information distribution description table, and the NE collected information's extraction method is different from at least one of the first information's extraction method included in the information distribution description table, and the at least one of the first information's extraction method belongs to the NE collected information's extraction method, determining the NE collected information's content as the first information's content, and according to the requirement of all the first information's extraction method that belongs to the NE collected information's extraction method, transmitting the first information's content to a corresponding functional unit with the extraction method belonging to the NE collected information's extraction method in the information distribution description table.

In an embodiment, when the NE collected information's identification is different from the identifications of all the information recorded in the information distribution description table, the information collected by the NE is incorrect, and an error type is unsubscribed information; or when the NE collected information's identification is the same as the first information's identification included in the information distribution description table, and the NE collected information's extraction method is different from any one of the first information's extraction methods included in the information distribution description table, and any one of the first information's extraction methods does not belong to the NE collected information's extraction method, the information collected by the NE is incorrect, and an error type is unsubscribed extraction method.

It should be noted here that the above-mentioned device provided by the embodiment of the present invention can implement all the method steps implemented by the above-mentioned method embodiment, and can achieve the same technical effect. The parts of this embodiment which are the same with the method embodiment and the beneficial effect thereof are not detailed again herein.

Based on the same inventive concept, an embodiment of the present disclosure also provides an information processing device, which is applied to NE. The structure diagram of the device is shown in FIG. 10, the transceiver 1500 is configured to receive and send data under the control of the processor 1510.

Figure 10:
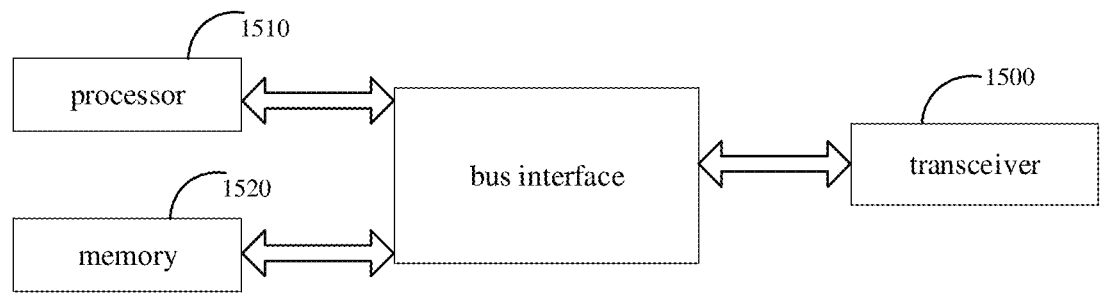
FIG. 10 is a schematic structural diagram of another information processing device in an embodiment of the present disclosure.

In FIG. 10, the bus architecture may include any number of interconnected buses and bridges, specifically one or more processors represented by the processor 15 10 and various circuits of the memory represented by the memory 1520 are linked together. The bus architecture can also link together various other circuits such as peripherals, voltage regulators, and power management circuits, etc., which are well known in the art and therefore will not be further described herein. The bus interface provides the interface. Transceiver 15 00 may be a plurality of elements, including a transmitter and a receiver, providing a unit for communicating with various other devices over transmission media, including wireless channels, wired channels, optical cables, and other transmission media. The processor 15 10 is responsible for managing the bus architecture and general processing, and the memory 15 20 can store data used by the processor 15 10 when performing operations.

The processors 15 and 10 may be CPUs, Application Specific Integrated Circuits (ASICs), Field Programmable Gate Arrays (FPGAs) or complex programmable logic devices (CPLD), the processor can also adopt a multi-core architecture.

The processor 1510 is configured to read the computer program in the memory and perform the following operations:

receiving a first message sent by a Parallel or Supplanting System (PSS), where the first message includes a first information's identification and a first information's extraction method;

collecting information according to the first information's identification and the first information's extraction method, and determining an information collection report, where the information collection report includes an NE collected information's identification, an NE collected information's extraction method, and an NE collected information's content; and sending the information collection report to the PSS, to enable the PSS to determine, based on the NE collected information's identification, the NE collected information's extraction method and the NE collected information's content, a correctness of the first information's identification and a correctness of the first information's extraction method, and distributing the information content with a correct identification and a correct extraction method to the corresponding internal functional unit.

It should be noted here that the above-mentioned device provided by the embodiment of the present invention can implement all the method steps implemented by the above-mentioned method embodiment, and can achieve the same technical effect. The parts of this embodiment which are the same with the method embodiment and the beneficial effect thereof are not detailed again herein.

Figure 11:
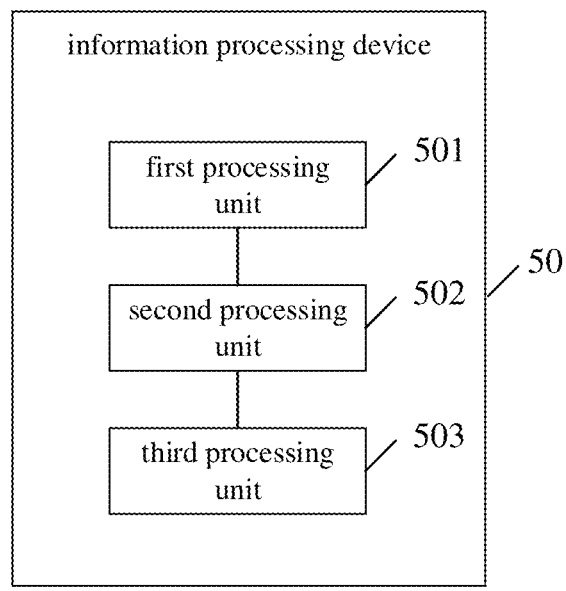
FIG. 11 is a schematic structural diagram of an information processing device in an embodiment of the present disclosure.

Based on the same inventive concept as the foregoing embodiments, the embodiments of the present disclosure also provide an information processing device, which is applied to a PSS. The structural diagram of the device is shown in FIG. 11. The information processing device 50 includes a first processing unit 501, a second processing unit 502 and a third processing unit 503.

The first processing unit is configured to, based on an internal function unit's requirement description for first information's content, send a first message to a network element (NE), where the first message includes a first information's identification and a first information's extraction method, to enable the NE to collect information according to the first information's identification and the first information's extraction method.

The second processing unit 502 is configured to receive an information collection report sent by the NE, where the information collection report includes an NE collected information's identification, an NE collected information's extraction method, and an NE collected information's content.

The third processing unit 503 is configured to, based on the NE collected information's identification, the NE collected information's extraction method and the NE collected information's content, determine a correctness of the first information's identification and a correctness of the first information's extraction method, and distribute the information content with a correct identification and a correct extraction method to the corresponding internal functional unit.

In an embodiment, the requirement description for the first information includes at least one of a demander's identification of the first information, the first information's identification, and the first information's extraction method;
    in a case that the NE is acknowledged being able to collect information according to the first information's identification and the first information's extraction method, storing the requirement description for the first information's content, to form one new record in an information distribution description table;
    in a case that the NE is acknowledged being able to collect information according to the first information's identification and the first information's extraction method, storing the first information's identification and the first information's extraction method included in the first message to form one new record in an information extraction description table.

In an embodiment, the first processing unit 501 is configured to:
    when the first information's identification is the same as a second information's identification in an information extraction description table, and the first information's extraction method is the same as a second information's extraction method, not send the first message to network element (NE); or when the first information's identification is the same as a second information's identification in an information extraction description table, and the first information's extraction method is different from second information's extraction methods, and the first information's extraction method belongs to one of the second information's extraction methods, not send the first message to network element (NE); or when the first information's identification is the same as a second information's identification in an information extraction description table, and the first information's extraction method is different from second information's extraction methods, and one of the second information's extraction methods belongs to the first information's extraction method, send the first message to the network element (NE), where the first message includes the first information's identification, the first information's extraction method and other second information's extraction methods that do not belong to the first information's extraction method; other second information's extraction methods that do not belong to the first information's extraction method are transmitted in the first message in an explicit manner through a full configuration method or in an implicit manner through a delta configuration method; or when the first information's identification is the same as a second information's identification in an information extraction description table, and the first information's extraction method is different from second information's extraction methods, and any of the second information's extraction methods does not belong to the first information's extraction method and the first information's extraction method does not belong to any of the second information's extraction methods, sending the first message to the network element (NE), where the first message includes the first information's identification, the first information's extraction method and the second information's extraction methods; the second information's extraction methods in the first message are transmitted in the first message in an explicit manner through a full configuration method or in an implicit manner through a delta configuration method.

In an embodiment, the first processing unit 501 is configured to: when the first information's identification is the same as the second information's identification in the information extraction description table, and the first information's extraction method is the same as one of second information's extraction methods, remain the information extraction description table in status quo, without any update; or when the first information's identification is the same as a second information's identification in an information extraction description table, and the first information's extraction method is different from second information's extraction methods, and the first information's extraction method belongs to one of the second information's extraction methods, remain the information extraction description table in status quo, without any update; or when the first information's identification is the same as a second information's identification in an information extraction description table, and the first information's extraction method is different from second information's extraction methods, and one of the second information's extraction methods belongs to the first information's extraction method, update the information extraction description table to obtain an updated information extraction description table, where the updated information extraction description table includes the first information's identification, the first information's extraction method and other second information's extraction methods that do not belong to the first information's extraction method; or when the first information's identification is the same as a second information's identification in an information extraction description table, and the first information's extraction method is different from second information's extraction methods, and any of the second information's extraction methods does not belong to the first information's extraction method and the first information's extraction method does not belong to any one of the second information's extraction methods, update the information extraction description table to obtain an updated information extraction description table, where the updated information extraction description table includes the first information's identification, the first information's extraction method, and the second information's extraction methods.

In an embodiment, the third processing unit 503 is configured to: when the NE collected information's identification is the same as the first information's identification included in the information distribution description table, and the NE collected information's extraction method is the same as at least one of the first information's extraction method included in the information distribution description table, determine the NE collected information's content as the first information's content, and transmit the first information's content to a corresponding functional unit which is marked with the same extraction method in the information distribution description table; or when the NE collected information's identification is the same as the first information's identification included in the information distribution description table, and the NE collected information's extraction method is different from at least one of the first information's extraction method included in the information distribution description table, and the at least one of the first information's extraction method belongs to the NE collected information's extraction method, determine the NE collected information's content as the first information's content, and according to the requirement of all the first information's extraction method that belongs to the NE collected information's extraction method, transmit the first information's content to a corresponding functional unit with the extraction method belonging to the NE collected information's extraction method in the information distribution description table.

In an embodiment, when the NE collected information's identification is different from the identifications of all the information recorded in the information distribution description table, the information collected by the NE is incorrect, and an error type is unsubscribed information; or when the NE collected information's identification is the same as the first information's identification included in the information distribution description table, and the NE collected information's extraction method is different from any one of the first information's extraction methods included in the information distribution description table, and any one of the first information's extraction methods does not belong to the NE collected information's extraction method, the information collected by the NE is incorrect, and an error type is unsubscribed extraction method.

It should be noted here that the above-mentioned device provided by the embodiment of the present invention can implement all the method steps implemented by the above-mentioned method embodiment, and can achieve the same technical effect. The parts of this embodiment which are the same with the method embodiment and the beneficial effect thereof are not detailed again herein.

Figure 12:
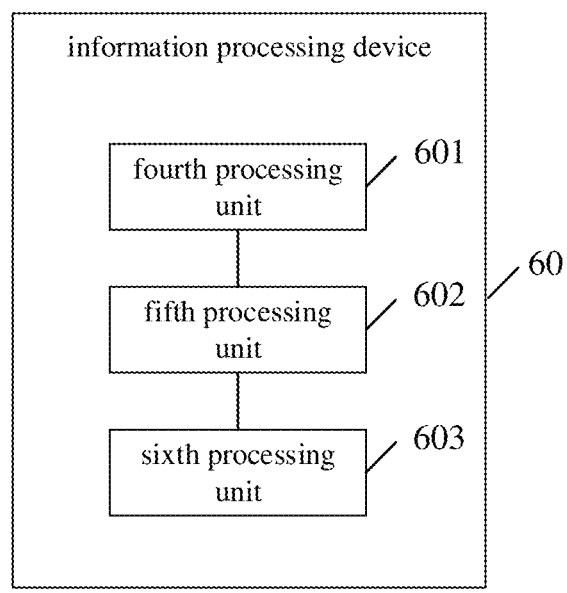
FIG. 12 is a schematic structural diagram of another information processing device in an embodiment of the present disclosure.

Based on the same inventive concept as the foregoing embodiments, the embodiments of the present disclosure also provide an information processing device, which is applied to NE. The structural diagram of the device is shown in FIG. 12, and the information processing device 60 includes a fourth processing unit 601, a fifth processing unit 602 and a sixth processing unit 603.

The fourth processing unit 601 is configured to receive a first message sent by a Parallel or Supplanting System (PSS), where the first message includes a first information's identification and a first information's extraction method.

The fifth processing unit 602 is configured to collect information according to the first information's identification and the first information's extraction method, and determining an information collection report, where the information collection report includes an NE collected information's identification, an NE collected information's extraction method, and an NE collected information's content.

The sixth processing unit 603 is configured to the information collection report to the PSS, to enable the PSS to determine, based on the NE collected information's identification, the NE collected information's extraction method and the NE collected information's content, a correctness of the first information's identification and a correctness of the first information's extraction method, and distributing the information content with a correct identification and a correct extraction method to the corresponding internal functional unit.

It should be noted here that the above-mentioned device provided by the embodiment of the present invention can implement all the method steps implemented by the above-mentioned method embodiment, and can achieve the same technical effect. The parts of this embodiment which are the same with the method embodiment and the beneficial effect thereof are not detailed again herein.

It should be noted that the division of the units in the embodiment of the present disclosure is schematic, and is only a logical function division, and there may be another division manner in actual implementation. In addition, each functional unit in each embodiment of the present disclosure may be integrated into one processing unit, each unit may exist separately physically, or two or more units may be integrated into one unit. The above-mentioned integrated units can be implemented in the form of hardware or in the form of software functional units.

If the integrated unit is realized in the form of a software function unit and sold or used as an independent product, it can be stored in a processor-readable storage medium, based on this understanding, the technical solution of the present disclosure is essentially or part of the contribution to the prior art, or all or part of the technical solution can be embodied in the form of a software product, and the computer software product is stored in a storage medium, including several instructions for causing a computer device (which may be a personal computer, a server, or a network device, etc.) or a processor to execute all or part of the steps of the methods described in various embodiments of the present disclosure. The aforementioned storage media include: U disk, mobile hard disk, read-only memory (ROM), random access memory (RAM), magnetic disk or optical disk and other media that can store program codes.

Based on the same inventive concept, the embodiments of the present disclosure also provide a processor-readable storage medium storing a computer program, and the computer program is used to implement any one of the embodiments of the present disclosure or steps of any information processing method provided in any embodiment of the present disclosure.

The processor-readable storage medium can be any available medium or data storage device that can be accessed by the processor, including but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid-state hard drive (SSD)), etc.

Those skilled in the art should understand that the embodiments of the present disclosure may be provided as methods, systems, or computer program products. Accordingly, the present disclosure can take the form of an entirely hardware embodiment, an entirely software embodiment, or an embodiment combining software and hardware aspects. Furthermore, the present disclosure may take the form of a computer program product embodied on one or more computer-usable storage media (including but not limited to magnetic disk storage, optical storage, etc.) having computer-usable program code embodied therein.

The present disclosure is described with reference to flowchart illustrations and/or block diagrams of methods, apparatus (systems), and computer program products according to embodiments of the present disclosure. It should be understood that each procedure and/or block in the flowchart and/or block diagrams, and combinations of procedures and/or blocks in the flowchart and/or block diagrams can be implemented by computer-executable instructions. These computer-executable instructions can be provided to a general purpose computer, special purpose computer, embedded processor, or processor of other programmable data processing equipment to produce a machine, such that instructions executed by the processor of the computer or other programmable data processing equipment produce means for implementing the functions specified in one or more procedures of a flowchart and/or one or more blocks of a block diagram.

These processor-executable instructions may also be stored in a processor-readable memory capable of directing a computer or other programmable data processing device to operate in a specific manner, such that the instructions stored in the processor-readable memory produce a manufacturing product, the instruction device implements the function specified in one or more procedures of the flow chart and/or one or more blocks of the block diagram.

These processor-executable instructions may also be loaded onto a computer or other programmable data processing device, so that a series of operational steps are performed on the computer or other programmable device to generate a computer-implemented processing. As a result, instructions performed on a computer or other programmable device provide steps for implementing the functions specified in one process or multi processes in the flowchart and/or one box or multiple boxes in a block diagram.

It is obvious that those skilled in the art can make various changes and modifications to the present disclosure without departing from the spirit and scope of the present disclosure. Therefore, if these modifications and variations of the present disclosure fall within the scope of the claims of the present disclosure and equivalent technologies thereof, the present disclosure also intends to include these modifications and variations.

What is claimed is:

1. An information processing method, performed by a Parallel or Supplanting System (PSS), comprising:
    based on an internal function unit's requirement description for first information's content, sending, by the PSS, a first message to a network element (NE), wherein the first message comprises a first information's identification and a first information's extraction method, to enable the NE to collect information according to the first information's identification and the first information's extraction method;
    receiving an information collection report sent by the NE, wherein the information collection report comprises an NE collected information's identification, an NE collected information's extraction method, and an NE collected information's content; and
    according to the NE collected information's identification, the NE collected information's extraction method and the NE collected information's content, determining a correctness of the first information's identification and a correctness of the first information's extraction method, and distributing the information content with a correct identification and a correct extraction method to the corresponding internal functional unit.

2. The method according to claim 1, wherein
    the requirement description for the first information comprises at least one of a demander's identification of the first information, the first information's identification, and the first information's extraction method;
    in a case that the NE is acknowledged being able to collect information according to the first information's identification and the first information's extraction method, storing, by the PSS, the requirement description for the first information's content, to form one new record in an information distribution description table;
    in a case that the NE is acknowledged being able to collect information according to the first information's identification and the first information's extraction method, storing, by the PSS, the first information's identification and the first information's extraction method comprised in the first message to form one new record in an information extraction description table.

3. The method according to claim 2, wherein the forming one new record of the information extraction description table comprises:
    when the first information's identification is the same as the second information's identification in the information extraction description table, and the first information's extraction method is the same as one of second information's extraction methods, remaining the information extraction description table in status quo, without any update; or
    when the first information's identification is the same as a second information's identification in an information extraction description table, and the first information's extraction method is different from second information's extraction methods, and the first information's extraction method belongs to one of the second information's extraction methods, remaining the information extraction description table in status quo, without any update; or
    when the first information's identification is the same as a second information's identification in an information extraction description table, and the first information's extraction method is different from second information's extraction methods, and one of the second information's extraction methods belongs to the first information's extraction method, updating the information extraction description table to obtain an updated information extraction description table, wherein the updated information extraction description table comprises the first information's identification, the first information's extraction method and other second information's extraction methods that do not belong to the first information's extraction method; or
    when the first information's identification is the same as a second information's identification in an information extraction description table, and the first information's extraction method is different from second information's extraction methods, and any of the second information's extraction methods does not belong to the first information's extraction method and the first information's extraction method does not belong to any one of the second information's extraction methods, updating the information extraction description table to obtain an updated information extraction description table, wherein the updated information extraction description table comprises the first information's identification, the first information's extraction method, and the second information's extraction methods.

4. The method according to claim 1, wherein the sending the first message to the network element (NE) comprises:

when the first information's identification is the same as a second information's identification in an information extraction description table, and the first information's extraction method is the same as a second information's extraction method, not sending the first message to network element (NE); or when the first information's identification is the same as a second information's identification in an information extraction description table, and the first information's extraction method is different from second information's extraction methods, and the first information's extraction method belongs to one of the second information's extraction methods, not sending the first message to network element (NE); or when the first information's identification is the same as a second information's identification in an information extraction description table, and the first information's extraction method is different from second information's extraction methods, and one of the second information's extraction methods belongs to the first information's extraction method, sending the first message to the network element (NE), wherein the first message comprises the first information's identification, the first information's extraction method and other second information's extraction methods that do not belong to the first information's extraction method; other second information's extraction methods that do not belong to the first information's extraction method are transmitted in the first message in an explicit manner through a full configuration method or in an implicit manner through a delta configuration method; or when the first information's identification is the same as a second information's identification in an information extraction description table, and the first information's extraction method is different from second information's extraction methods, and any of the second information's extraction methods does not belong to the first information's extraction method and the first information's extraction method does not belong to any of the second information's extraction methods, sending the first message to the network element (NE), wherein the first message comprises the first information's identification, the first information's extraction method and the second information's extraction methods; the second information's extraction methods in the first message are transmitted in the first message in an explicit manner through a full configuration method or in an implicit manner through a delta configuration method.

5. The method according to claim 1, wherein based on the NE collected information's identification, the NE collected information's extraction method and the NE collected information's content, the determining the correctness of the identification and the correctness of the first information's extraction method, and distributing the information content with a correct identification and a correct extraction method to the corresponding internal functional unit comprises:

when the NE collected information's identification is the same as the first information's identification comprised in the information distribution description table, and the NE collected information's extraction method is the same as at least one of the first information's extraction method comprised in the information distribution description table, determining the NE collected information's content as the first information's content, and transmitting the first information's content to the corresponding internal functional unit which is marked with the same extraction method in the information distribution description table; or when the NE collected information's identification is the same as the first information's identification comprised in the information distribution description table, and the NE collected information's extraction method is different from at least one of the first information's extraction method comprised in the information distribution description table, and at least one of the first information's extraction method belongs to the NE collected information's extraction method, determining the NE collected information's content as the first information's content, and according to the requirement of all the first information's extraction method that belongs to the NE collected information's extraction method, transmitting the first information's content to the corresponding internal functional unit which is marked with the extraction method belongs to the NE collected information's extraction method in the information distribution description table.

6. The method according to claim 5, wherein the method further comprises:

when the NE collected information's identification is different from the identifications of all the information recorded in the information distribution description table, the information collected by the NE is incorrect, and an error type is unsubscribed information; or when the NE collected information's identification is the same as the first information's identification comprised in the information distribution description table, and the NE collected information's extraction method is different from any one of the first information's extraction methods comprised in the information distribution description table, and any one of the first information's extraction methods does not belong to the NE collected information's extraction method, the information collected by the NE is incorrect, and an error type is unsubscribed extraction method.

7. An information processing method, performed by a network element (NE), comprising:

receiving a first message sent by a Parallel or Supplanting System (PSS), wherein the first message comprises a first information's identification and a first information's extraction method;

collecting information according to the first information's identification and the first information's extraction method, and determining an information collection report, wherein the information collection report comprises an NE collected information's identification, an NE collected information's extraction method, and an NE collected information's content; and sending the information collection report to the PSS, to enable the PSS to determine, based on the NE collected information's identification, the NE collected information's extraction method and the NE collected information's content, a correctness of the first information's identification and a correctness of the first information's extraction method, and distributing the information content with a correct identification and a correct extraction method to a corresponding internal functional unit.

8. An information processing device, applied to a Network Element (NE), comprising a memory, a transceiver, and a processor:

the memory is configured to store a computer program;
the transceiver is configured to send and receive data under a control of the processor; the processor is configured to read the computer program in the memory to perform the information processing method according to claim 7.

9. An information processing device, applied to a Parallel or Supplanting System (PSS), comprising a memory, a transceiver, and a processor:
- the memory is configured to store a computer program; the transceiver is configured to send and receive data under a control of the processor; the processor is configured to read the computer program in the memory to perform:
- based on an internal function unit's requirement description for first information's content, sending, by the PSS, a first message to a network element (NE), wherein the first message comprises a first information's identification and a first information's extraction method, to enable the NE to collect information according to the first information's identification and the first information's extraction method;
- receiving an information collection report sent by the NE, wherein the information collection report comprises an NE collected information's identification, an NE collected information's extraction method, and an NE collected information's content; and
- based on the NE collected information's identification, the NE collected information's extraction method and the NE collected information's content, determining a correctness of the first information's identification and a correctness of the first information's extraction method, and distributing the information content with a correct identification and a correct extraction method to the corresponding internal functional unit.

10. The device according to claim 9, wherein
- the requirement description for the first information comprises at least one of a demander's identification of the first information, the first information's identification, and the first information's extraction method;
- in a case that the NE is acknowledged being able to collect information according to the first information's identification and the first information's extraction method, storing the requirement description for the first information's content, to form one new record in an information distribution description table;
- in a case that the NE is acknowledged being able to collect information according to the first information's identification and the first information's extraction method, storing the first information's identification and the first information's extraction method comprised in the first message to form one new record in an information extraction description table.

11. The device according to claim 9, wherein the sending the first message to the network element (NE) comprises:
- when the first information's identification is the same as a second information's identification in an information extraction description table, and the first information's extraction method is the same as a second information's extraction method, not sending the first message to network element (NE); or
- when the first information's identification is the same as a second information's identification in an information extraction description table, and the first information's extraction method is different from second information's extraction methods, and the first information's extraction method belongs to one of the second information's extraction methods, not sending the first message to network element (NE); or
- when the first information's identification is the same as a second information's identification in an information extraction description table, and the first information's extraction method is different from second information's extraction methods, and one of the second information's extraction methods belongs to the first information's extraction method, sending the first message to the network element (NE), wherein the first message comprises the first information's identification, the first information's extraction method and other second information's extraction methods that do not belong to the first information's extraction method; other second information's extraction methods that do not belong to the first information's extraction method are transmitted in the first message in an explicit manner through a full configuration method or in an implicit manner through a delta configuration method; or
- when the first information's identification is the same as a second information's identification in an information extraction description table, and the first information's extraction method is different from second information's extraction methods, and any of the second information's extraction methods does not belong to the first information's extraction method and the first information's extraction method does not belong to any of the second information's extraction methods, sending the first message to the network element (NE), wherein the first message comprises the first information's identification, the first information's extraction method and the second information's extraction methods; the second information's extraction methods in the first message are transmitted in the first message in an explicit manner through a full configuration method or in an implicit manner through a delta configuration method.

12. The device according to claim 10, wherein the forming the new record of the information extraction description table comprises:
- when the first information's identification is the same as the second information's identification in the information extraction description table, and the first information's extraction method is the same as one of second information's extraction methods, remaining the information extraction description table in status quo, without any update; or
- when the first information's identification is the same as a second information's identification in an information extraction description table, and the first information's extraction method is different from second information's extraction methods, and the first information's extraction method belongs to one of the second information's extraction methods, remaining the information extraction description table in status quo, without any update; or
- when the first information's identification is the same as a second information's identification in an information extraction description table, and the first information's extraction method is different from second information's extraction methods, and one of the second information's extraction methods belongs to the first information's extraction method, updating the information extraction description table to obtain an updated information extraction description table, wherein the updated information extraction description table comprises the first information's identification, the first information's extraction method and other information's extraction methods that do not belong to the first information's extraction method; or when the first information's identification is the same as a second information's identification in an information extraction description table, and the first information's extraction method is different from second information's extraction methods, and any of the second information's extraction methods does not belong to the first information's extraction method and the first information's extraction method does not belong to any one of the second information's extraction methods, updating the information extraction description table to obtain an updated information extraction description table, wherein the updated information extraction description table comprises the first information's identification, the first information's extraction method, and the second information's extraction methods.

13. The device according to claim 9, wherein the based on the NE collected information's identification, the NE collected information's extraction method and the NE collected information's content, determining the correctness of the identification and the correctness of the first information's extraction method, and distributing the information content with a correct identification and a correct extraction method to the corresponding internal functional unit comprises:

when the NE collected information's identification is the same as the first information's identification comprised in the information distribution description table, and the NE collected information's extraction method is the same as at least one of the first information's extraction method comprised in the information distribution description table, determining the NE collected information's content as the first information's content, and transmitting the first information's content to a corresponding functional unit which is marked with the same extraction method in the information distribution description table; or when the NE collected information's identification is the same as the first information's identification comprised in the information distribution description table, and the NE collected information's extraction method is different from at least one of the first information's extraction method comprised in the information distribution description table, and the at least one of the first information's extraction method belongs to the NE collected information's extraction method, determining the NE collected information's content as the first information's content, and according to the requirement of all the first information's extraction method that belongs to the NE collected information's extraction method, transmitting the first information's content to a corresponding functional unit with the extraction method belonging to the NE collected information's extraction method in the information distribution description table.

14. The device according to claim 13, wherein when the NE collected information's identification is different from the identifications of all the information recorded in the information distribution description table, the information collected by the NE is incorrect, and an error type is unsubscribed information; or when the NE collected information's identification is the same as the first information's identification comprised in the information distribution description table, and the NE collected information's extraction method is different from any one of the first information's extraction methods comprised in the information distribution description table, and any one of the first information's extraction methods does not belong to the NE collected information's extraction method, the information collected by the NE is incorrect, and an error type is unsubscribed extraction method.

* * * * *